United States Patent
Kim et al.

(10) Patent No.: US 12,126,557 B2
(45) Date of Patent: Oct. 22, 2024

(54) METHOD AND APPARATUS FOR TRANSMITTING AND RECEIVING DATA CHANNEL IN WIRELESS COMMUNICATION SYSTEM

(71) Applicant: Samsung Electronics Co., Ltd., Suwon-si (KR)

(72) Inventors: Youngbum Kim, Suwon-si (KR); Jinkyu Kang, Suwon-si (KR); Taehyoung Kim, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 17/596,374

(22) PCT Filed: Jul. 2, 2020

(86) PCT No.: PCT/KR2020/008645
§ 371 (c)(1),
(2) Date: Dec. 8, 2021

(87) PCT Pub. No.: WO2021/006540
PCT Pub. Date: Jan. 14, 2021

(65) Prior Publication Data
US 2022/0247531 A1    Aug. 4, 2022

(30) Foreign Application Priority Data

Jul. 8, 2019    (KR) .......................... 10-2019-0082056

(51) Int. Cl.
*H04L 5/00*    (2006.01)

(52) U.S. Cl.
CPC ................................. *H04L 5/0048* (2013.01)

(58) Field of Classification Search
CPC ..................................................... H04L 5/0048
See application file for complete search history.

(56) References Cited

U.S. PATENT DOCUMENTS

2015/0341957 A1    11/2015    Tang et al.
2016/0128011 A1*    5/2016    Yang ..................... H04W 72/23
                                                                       370/329
(Continued)

FOREIGN PATENT DOCUMENTS

CN    108353062 A    7/2018
CN    109842917 A    6/2019
(Continued)

OTHER PUBLICATIONS

European Patent Office, "Supplementary European Search Report," dated Jul. 8, 2022, in connection with European Patent Application No. 20837835.6, 14 pages.
(Continued)

*Primary Examiner* — Zhiren Qin

(57) ABSTRACT

The present disclosure relates to: a communication technique for merging IoT technology with a 5G communication system for supporting higher data transmission rates than 4G systems; and a system therefor. The present disclosure can be applied to intelligent services (e.g., smart homes, smart buildings, smart cities, smart cars or connected cars, healthcare, digital education, retail businesses, security and safety related services, etc.) on the basis of 5G communication technology and IoT-related technologies. The present disclosure relates to a method for transmitting and receiving a data channel.

15 Claims, 18 Drawing Sheets

(56) References Cited

U.S. PATENT DOCUMENTS

| | | | |
|---|---|---|---|
| 2017/0141833 A1* | 5/2017 | Kim | H04L 5/0057 |
| 2017/0230951 A1 | 8/2017 | Xiong et al. | |
| 2018/0343571 A1 | 11/2018 | Kim et al. | |
| 2019/0098590 A1 | 3/2019 | Nam et al. | |
| 2019/0349840 A1 | 11/2019 | Zhang et al. | |
| 2020/0045672 A1 | 2/2020 | Yang | |
| 2020/0045726 A1* | 2/2020 | Ly | H04W 48/12 |
| 2020/0045737 A1* | 2/2020 | Ly | H04W 74/0808 |
| 2021/0067270 A1* | 3/2021 | Sui | H04L 5/0091 |

FOREIGN PATENT DOCUMENTS

| | | |
|---|---|---|
| KR | 10-2017-0039694 A | 4/2017 |
| KR | 10-2019-0029646 A | 3/2019 |
| WO | 2018231918 A1 | 12/2018 |
| WO | 2019051802 A1 | 3/2019 |
| WO | 2021002725 A1 | 1/2021 |

OTHER PUBLICATIONS

Huawei et al: "Introduction of system information acquisition optimisation in MIB and SIB4", R2-1804832, 3GPP TSG-RAN WG2 Meeting #101bis, Sanya, China, Apr. 16-20, 2017, 5 pages.

Samsung: "SIB-1 Transmission for Low Cost UEs", R1-154106, 3GPP TSG RAN WG1 #82, Beijing, China, Aug. 24-28, 2015, 3 pages.

Intel Corporation: "Correction on higher layer parameter schedulingInfoSIB1-BR-r13", R1-1803093, 3GPP TSG RAN WG1 Meeting #92, Athens, Greece, Feb. 26-Mar. 2, 2018, 4 pages.

3GPP TS 36.331 V15.1.0 (Mar. 2018); Technical Specification; 3rd Generation Partnership Project; Technical Specification Group Radio Access Network; Evolved Universal Terrestrial Radio Access (E-UTRA); Radio Resource Control (RRC); Protocol specification (Release 15); 786 pages.

International Search Report and Written Opinion of the International Searching Authority in connection with International Application No. PCT/KR2020/008645 issued Sep. 29, 2020, 11 pages.

3GPP TS 38.331 V15.6.0, Technical Specification, 3rd Generation Partnership Project; Technical Specification Group Radio Access Network; NR; Radio Resource Control (RRC) protocol specification (Release 15), Jun. 2019, 519 pages.

Office Action issued Mar. 6, 2024, in connection with Chinese Patent Application No. 202080045385.7, 17 pages.

Communication pursuant to Article 94(3) EPC dated Jun. 19, 2024, in connection with European Patent Application No. 20 837 835.6, 7 pages.

Office Action issued Jun. 27, 2024 in connection with Korean Patent Application No. 10-2019-0082056, 9 pages.

Huawei et al., "Correction on PDCCH monitoring", R1-1905883, 3GPP TSG RAN WG1 Meeting #96bis, Xian, China, Apr. 2019, 10 pages.

3GPP TS 38.213 V15.6.0 (Jun. 2019), Technical Specification;3rd Generation Partnership Project; Technical Specification Group Radio Access Network; NR; Physical layer procedures for control (Release 15); 107 pages.

* cited by examiner

METHOD AND APPARATUS FOR TRANSMITTING AND RECEIVING DATA CHANNEL IN WIRELESS COMMUNICATION SYSTEM

CROSS-REFERENCE TO RELATED APPLICATIONS

This application is a 371 of International Application No. PCT/KR2020/008645, filed Jul. 2, 2020, which claims priority to Korean Patent Application No. 10-2019-0082056, filed Jul. 8, 2019, the disclosures of which are herein incorporated by reference in their entirety.

BACKGROUND

1. Field

The disclosure relates to a method and an apparatus for transmitting and receiving a data channel in a cellular wireless communication system. Specifically, the disclosure relates to a method and an apparatus for transmitting and receiving a data channel for transmitting a system information block from a base station to a terminal.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system.

The 5G communication system is considered to be implemented in higher frequency (mmWave) bands (e.g., 60 GHz bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In recent years, various studies have been conducted for coverage enhancement with a demand for a next-generation communication system. In particular, there is a growing demand for coverage enhancement for a data channel.

SUMMARY

A technical aspect of the disclosure is to provide a method and an apparatus for transmitting and receiving a data channel in which an efficient system information block is transmitted for various services in a mobile communication system.

The technical subjects pursued in the disclosure may not be limited to the above-mentioned matters, and other technical subjects which are not mentioned may be considered from the following description of embodiments of the disclosure by those skilled in the art to which the disclosure pertains.

To achieve the foregoing technical aspect, a method of a terminal includes receiving a synchronization signal block (SSB) from a base station, receiving downlink control information for scheduling a physical downlink shared channel (PDSCH) in which a system information block (SIB) is transmitted, based on a master information block (MIB) included in the SSB, identifying a transmission period and a number of transmissions of the SIB, and receiving the SIB from the base station, based on the scheduled PDSCH, the transmission period, and the number of transmissions.

To achieve the foregoing technical aspect, a method of a base station includes transmitting a synchronization signal block (SSB) to a terminal, transmitting downlink control information for scheduling a physical downlink shared channel (PDSCH) in which a system information block (SIB) is transmitted, based on a master information block (MIB) included in the SSB, identifying a transmission period and a number of transmissions of the SIB, and transmitting the SIB to the terminal, based on the scheduled PDSCH, the transmission period, and the number of transmissions.

To achieve the foregoing technical aspect, a terminal includes a transceiver configured to transmit and receive a signal, and a controller configured to receive a synchronization signal block (SSB) from a base station, receive downlink control information for scheduling a physical downlink shared channel (PDSCH) in which a system information block (SIB) is transmitted, based on a master information block (MIB) included in the SSB, identify a transmission period and a number of transmissions of the SIB, and receive the SIB from the base station, based on the scheduled PDSCH, the transmission period, and the number of transmissions.

To achieve the foregoing technical aspect, a base station includes a transceiver configured to transmit and receive a signal; and a controller configured to transmit a synchronization signal block (SSB) to a terminal, transmit downlink control information for scheduling a physical downlink shared channel (PDSCH) in which a system information block (SIB) is transmitted, based on a master information block (MIB) included in the SSB, identify a transmission period and a number of transmissions of the SIB, and transmit the SIB to the terminal, based on the scheduled PDSCH, the transmission period, and the number of transmissions.

According to various embodiments of the disclosure, there may be provided a method and an apparatus for transmitting and receiving a data channel in which an efficient system information block is transmitted in a mobile communication system, thereby enabling a system and a node that intend to transmit a downlink signal to efficiently manage transmission of a data channel including system information blocks.

DETAILED DESCRIPTION

Figure 1:
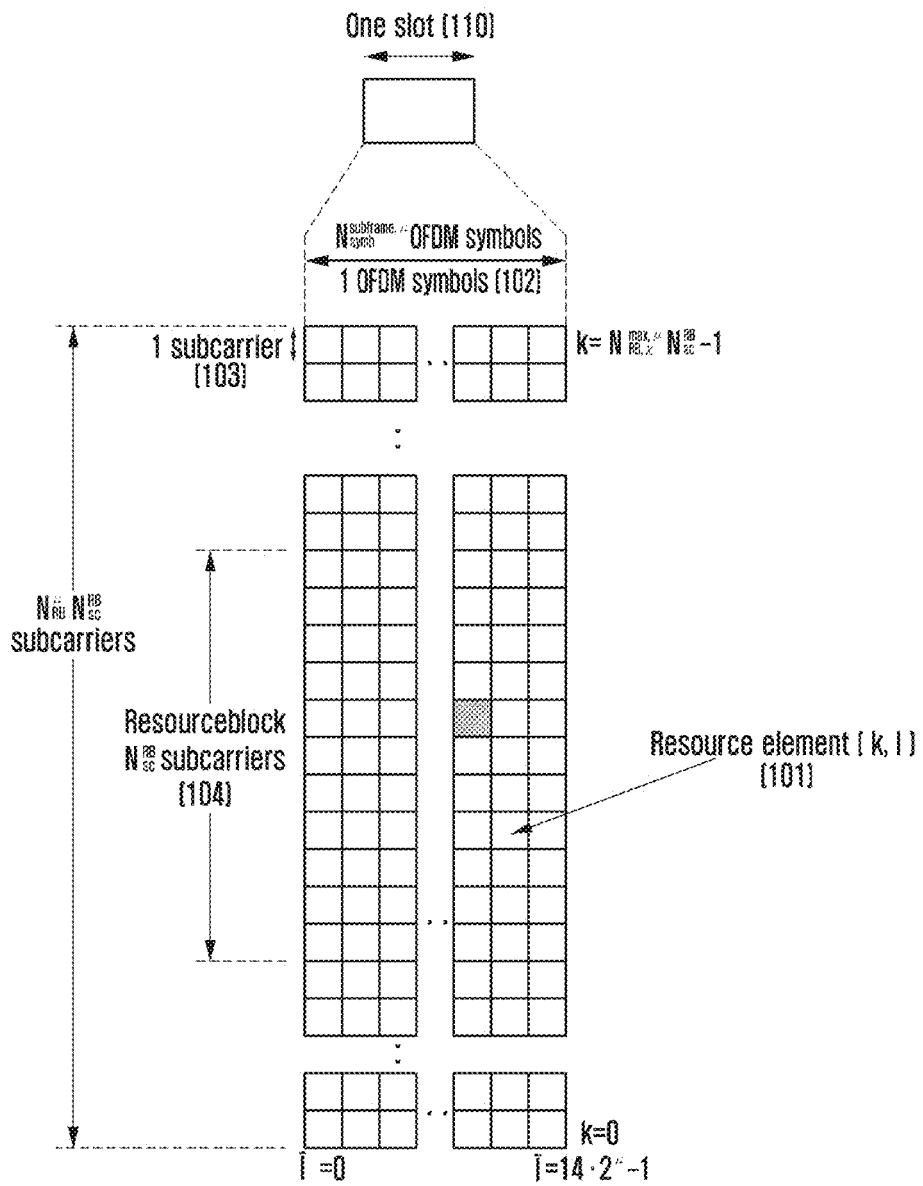
FIG. 1 illustrates the basic structure of a time-frequency domain, which is a radio resource region in a 5G system in connection with an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions.

In the disclosure, a "downlink (DL)" refers to a radio link via which a base station transmits a signal to a terminal, and an "uplink (UL)" refers to a radio link via which a terminal transmits a signal to a base station. Further, although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

A wireless communication system is evolving from initially providing voice-oriented services into a broadband wireless communication system for providing high-speed and high-quality packet data services according to a communication standard, for example, high speed packet access (HSPA), long-term evolution (LTE or evolved universal terrestrial radio access (E-UTRA)), LTE-advanced (LTE-A), or LTE-Pro of the 3GPP, high rate packet data (HRPD) or ultra-mobile broadband (UMB) of the 3GPP2, and IEEE 802.16e.

As a representative example of the broadband wireless communication system, an LTE system employs an orthogonal frequency division multiplexing (OFDM) scheme for a downlink (DL) and employs a single-carrier frequency division multiple access (SC-FDMA) scheme for an uplink (UL). The uplink refers to a radio link for a terminal to transmit data or a control signal to a base station, and the downlink refers to a radio link for the base station to transmit data or a control signal to the terminal. These multiple access schemes may generally allocate and manage time-frequency resources for carrying data or control information per user not to overlap with each other, that is, to be orthogonal to each other, thereby dividing data or control information for each user.

As a post-LTE communication system, a 5G communication system is required to support services satisfying various requirements at the same time to freely reflect various demands from users and service providers. Services considered for a 5G communication system include enhanced mobile broadband (eMBB), massive machine-type communication (mMTC), ultra-reliability and low-latency communications (URLLC), and the like.

eMBB is intended to provide a further enhanced data rate than that supported by existing LTE, LTE-A, or LTE-Pro systems. For example, in a 5G communication system, for one base station, eMBB needs to be able to provide a peak data rate of 20 Gbps in a downlink and a peak data rate of 10 Gbps in an uplink. Further, the 5G communication system needs not only to provide the peak data rate but also to provide an increased user-perceived data rate. In order to meet these requirements, various improved transmission and reception technologies including an enhanced multiple-input and multiple-output (MIMO) transmission technology may be required. In addition, while an LTE system transmits a signal using a transmission bandwidth of up to 20 MHz in a 2-GHz band, the 5G communication system may employ a frequency bandwidth wider than 20 MHz in a frequency band ranging from 3 to 6 GHz or a 6-GHz frequency band or higher, making it possible to satisfy a data rate required for the 5G communication system.

In the 5G communication system, mMTC is taken into consideration to support application services, such as the Internet of things (IoT). To efficiently provide the IoT, mMTC requires support for access of a great number of UEs in a cell, enhanced UE coverage, increased battery time, reduced UE cost, and the like. The IoT is attached to various sensors and various devices to provide a communication function and thus needs to be able to support a large number of UEs (e.g., 1,000,000 UEs/km2) in a cell. A UE supporting mMTC is highly likely to be located in a shadow area not covered by a cell, such as the basement of a building, due to the nature of services and thus requires wider coverage than for other services provided by the 5G communication system. A UE supporting mMTC needs to be configured as a low-cost UE, and requires a very long battery life time of 10 to 15 years because it is difficult to frequently change the battery of the UE.

Finally, URLLC is a mission-critical cellular-based wireless communication service. URLLC may be used, for example, for remote control of robots or machinery, industrial automation, unmanned aerial vehicles, remote health care, emergency alerts, and the like. Therefore, URLLC needs to provide ultralow-latency and ultrahigh-reliability communication. For example, a URLLC-supporting service needs not only to satisfy an air interface latency of less than 0.5 milliseconds but also to satisfy a required packet error rate of 10-5 or less. Therefore, for the URLLC-supporting service, a 5G system needs to provide a shorter transmission time interval (TTI) than that of other services and also needs to allocate a wide resource in a frequency band in order to secure the reliability of a communication link.

The three services of the 5G communication system (hereinafter, interchangeable with a 5G system), that is, mMTC, URLLC, and eMBB, may be transmitted via multiplexing in one system. Here, different transmission and reception schemes and different transmission and reception parameters may be used for the respective services in order to meet different requirements of the respective services.

Hereinafter, a frame structure of a 5G communication system will be described in detail with reference to accompanying drawings.

FIG. 1 illustrates the basic structure of a time-frequency domain, which is a radio resource region in a 5G system.

In FIG. 1, a horizontal axis denotes a time domain, and a vertical axis denotes a frequency domain. The basic unit of a resource in the time-frequency domain is a resource element (RE) 101, and the RE may be defined by one orthogonal frequency division multiplexing (OFDM) symbol (or discrete Fourier transform spread OFDM (DFT-s-OFDM) symbol) 102 on the time axis and one subcarrier 103 on the frequency axis. In the frequency domain, $N_{SC}^{RB}$ (e.g., 12) consecutive REs may form one resource block (RB) 104. In the time domain, $N_{symb}^{subframe}$ consecutive OFDM symbols may form one slot 110.

Figure 2:
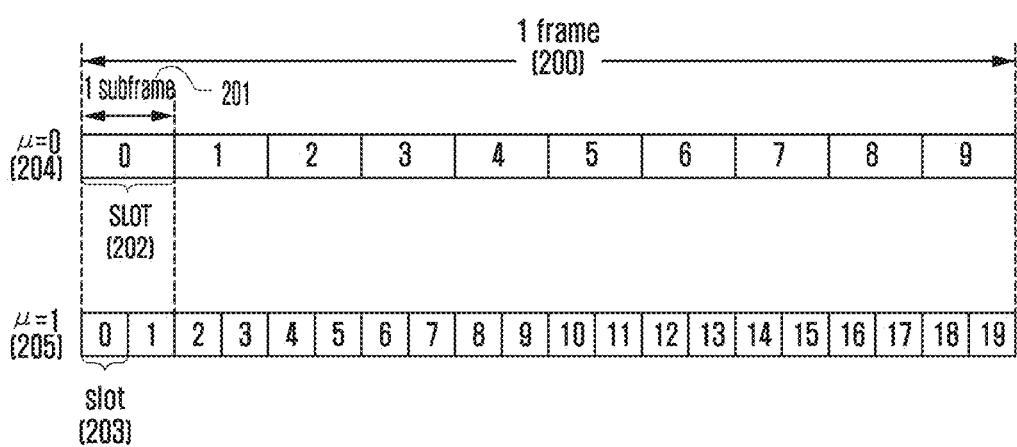
FIG. 2 illustrates a slot structure considered in a 5G communication system in connection with an embodiment of the disclosure.

FIG. 2 illustrates a slot structure considered in a 5G communication system.

FIG. 2 illustrates one example of structures of a frame 200, a subframe 201, and a slot 202. One frame 200 may be defined as 10 ms. One subframe 201 may be defined as 1 ms. Therefore, one frame 200 may include a total of ten subframes 201. One slot 202 and 203 may be defined as 14 OFDM symbols (i.e., the number of symbols per slot ($N_{symb}^{slot}$)=14). One subframe 201 may include one slot 202 or a plurality of slots 203, and the number of slots 202 and 203 per subframe 201 may vary depending on a configured subcarrier spacing value μ 204 and 205.

The example of FIG. 2 shows slot structures in a case where μ=0 (204) and μ=1 (205) as the set subcarrier spacing value. When μ=0 (204), one subframe 201 may include one slot 202, and when μ=1 (205), one subframe 201 may include two slots 203. That is, the number of slots per subframe ($N_{slot}^{subframe,\mu}$) may vary depending on the configured subcarrier spacing value μ, and the number of slots per frame ($N_{slot}^{frame,\mu}$) may vary accordingly. $N_{slot}^{subframe,\mu}$ and $N_{slot}^{frame,\mu}$ according to each subcarrier spacing setting μ may be defined as in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a base station may transmit a synchronization signal block (SSB, interchangeable with an SS block, SS/PBCH block, or the like) for initial access, and the synchronization signal block may include a primary synchronization signal (PSS), a secondary synchronization signal (SSS), and a physical broadcast channel (PBCH). In an initial access process in which a terminal initially accesses the system, the terminal first obtains downlink time and frequency domain synchronization and obtains a cell ID from a synchronization signal through a cell search. The synchronization signal includes a PSS and a SSS. Further, the terminal receives a master information block (MIB) on a PBCH from the base station to obtain system information related to transmission and reception, such as a system bandwidth or relevant control information, and a basic parameter value.

The synchronization signal is a reference signal for a cell search and is transmitted by applying subcarrier spacing suitable for a channel environment, such as phase noise, for each frequency band. The 5G base station may transmit a plurality of synchronization signal blocks according to the number of analog beams to be operated. The PSS and the SSS may be mapped and transmitted with 12 RBs, and the PBCH may be mapped and transmitted with 24 RBs. Hereinafter, a structure in which a synchronization signal and a PBCH are transmitted in the 5G communication system will be described.

Figure 3:
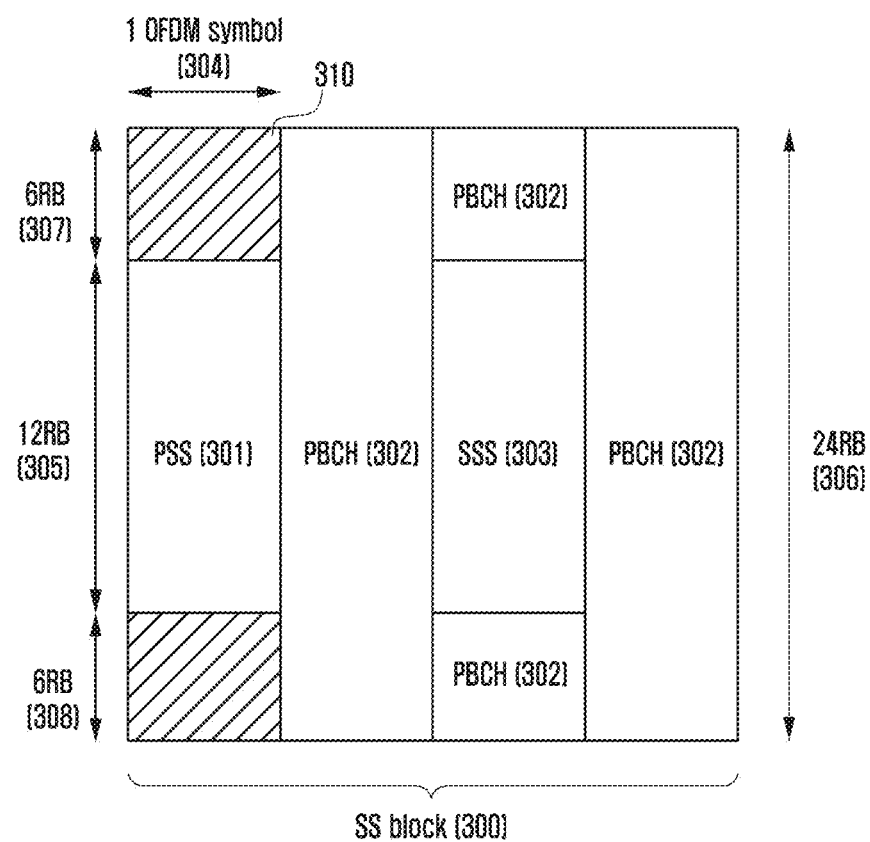
FIG. 3 illustrates a synchronization signal block (SSB) considered in a 5G communication system in connection with an embodiment of the disclosure.

FIG. 3 illustrates a synchronization signal block considered in a 5G communication system.

According to FIG. 3, the synchronization signal block 300 includes a PSS 301, an SSS 303, and a PBCH (broadcast channel) 302. As illustrated, the synchronization signal block 300 is mapped to four OFDM symbols on the time axis. The PSS 301 and the SSS 303 may be transmitted in 12 RBs 305 on the frequency axis and respectively in first and third OFDM symbols on the time axis. In the 5G system, a total of 1008 different cell IDs may be defined, and according to the physical layer ID of a cell, the PSS 301 may have three different values and the SSS 303 may have 336 different values. The terminal may obtain one of the 1008 cell IDs by detecting and combining the PSS 301 and the SSS 303, which may be represented by Equation 1.

$$N_{ID}^{cell}=3N_{ID}^{(1)}+N_{ID}^{(2)} \quad \text{[Equation 1]}$$

In Equation 1, N(1)ID may be estimated from the SSS 303 and has a value ranging from 0 to 335. N(2)ID may be estimated from the PSS 301 and has a value ranging from 0 to 2. The terminal may estimate a cell ID NcellID by combining N(1)ID and N(2)ID.

The PBCH 302 may be transmitted in resources corresponding to 24 RBs 306 on the frequency axis and second to fourth symbols of the SS block on the time axis, including six RBs 307 and 308 on both sides excluding 12 middle RBs, in which the SSS 303 is transmitted. Various types of system information called an MIB may be transmitted in the PBCH 302, and the MIB specifically includes information illustrated below in Table 2.

TABLE 2

| MIB ::= | SEQUENCE { |
|---|---|
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSB1, |
| cellBarred | ENUMERATED {barred, notBarred}, |
| intraFreqReselection | ENUMERATED {allowed, notAllowed}, |
| spare | BIT STRING (SIZE (1)) |
| } | |

In addition to Table 2, a PBCH payload and a PBCH demodulation reference signal (DMRS) include the following additional information.

Synchronization signal block information: A frequency-domain offset of the synchronization signal block is indicated through four-bit ssb-SubcarrierOffset in the MIB. An index of the synchronization signal block including the PBCH may be indirectly obtained through decoding of the PBCH DMRS and the PBCH. More specifically, in a frequency band of 6 GHz or lower, three bits obtained through decoding of the PBCH DMRS indicate the index of the synchronization signal block, and in the frequency band of 6 GHz or higher, a total of six bits including three bits obtained through decoding of the PBCH DMRS and three bits included in the PBCH payload and obtained through decoding of the PBCH indicates the index of the synchronization signal block including the PBCH.

Physical downlink control channel (PDCCH) information: Subcarrier spacing of a common downlink control channel is indicated through one-bit subCarrierSpacingCommon in the MIB, and time-frequency resource configuration information about a control resource set (CORESET) and a search space (SS) is indicated through eight-bit pdcch-ConfigSIB1.

System frame number (SFN): Six-bit systemFrameNumber in the MIB is used to indicate some SFNs. A four-bit least significant bit (LSB) of the SFN is included in the PBCH payload, and thus the terminal may indirectly obtain the SFN through decoding of the PBCH.

Timing information in radio frame: The terminal may indirectly identify whether the synchronization signal block is transmitted in a first or second half frame of a radio frame through the index of the synchronization signal block and one-bit half frame included in the PBCH payload and obtained through decoding of the PBCH.

A transmission bandwidth (12 RBs 305) of the PSS 301 and the SSS 303 and a transmission bandwidth (24 RBs 306) of the PBCH 302 are different from each other. Therefore, in the first OFDM symbol in which the PSS 301 is transmitted within the transmission bandwidth of the PBCH 302, six RBs 307 and 308 exist on both sides excluding 12 RBs in which the PSS 301 is transmitted, and this region may be used to transmit a different signal or may be unoccupied.

The entire synchronization signal block may be transmitted using the same analog beam. That is, all of the PSS 301, the SSS 303, and the PBCH 302 may be transmitted through the same beam. As an analog beam cannot be differently applied on the frequency axis, the same analog beam is applied to all frequency-axis RBs within a specific OFDM symbol to which a specific analog beam is applied. That is, all four OFDM symbols in which the PSS 301, the SSS 303, and the PBCH 302 are transmitted may be transmitted using the same analog beam.

Figure 4:
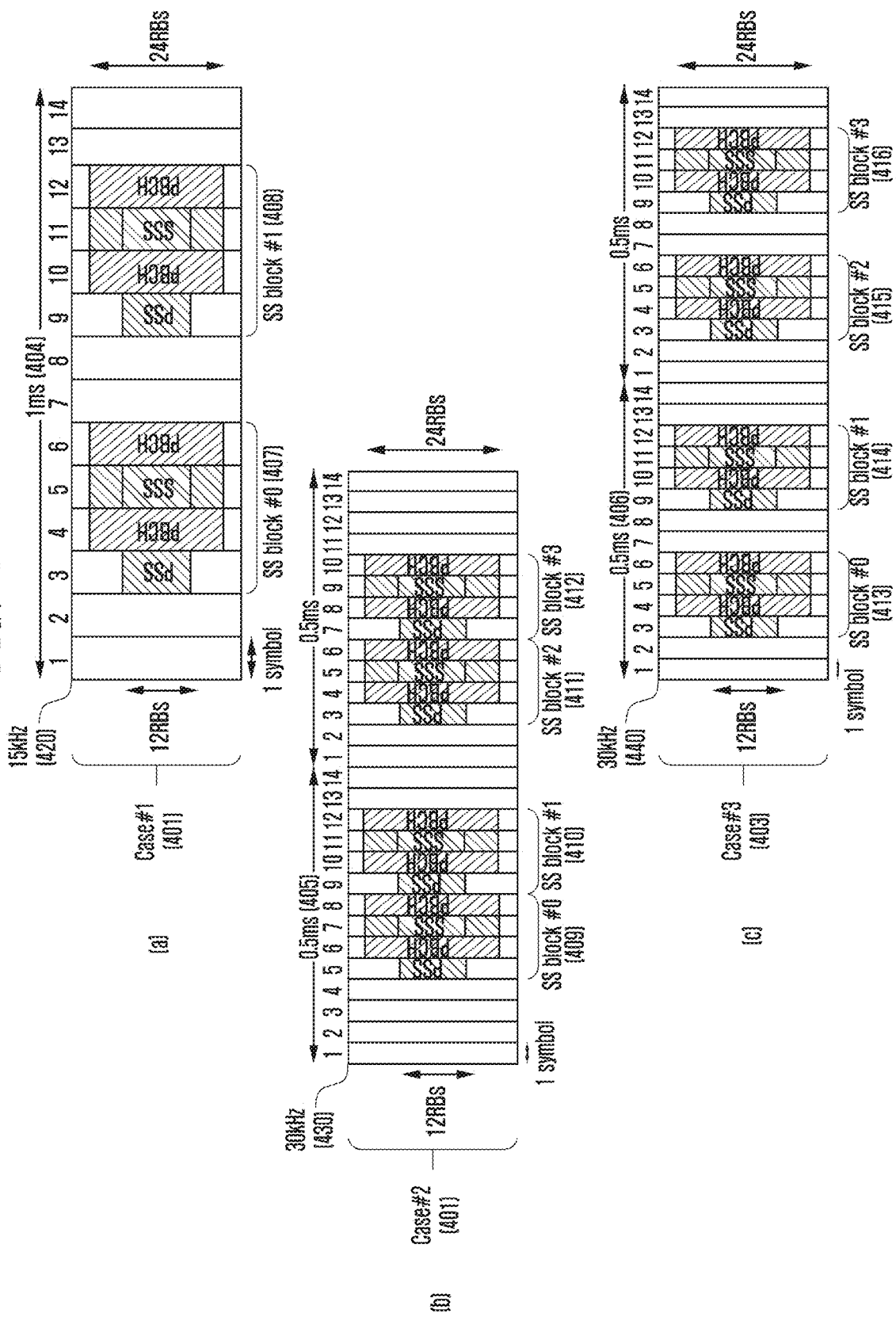
FIG. 4 illustrates transmission of a synchronization signal block in a frequency band of 6 GHz or less considered in a 5G communication system in connection with an embodiment of the disclosure.

FIG. 4 illustrates transmission cases of a synchronization signal block in a frequency band of 6 GHz or less considered in a 5G communication system. In the 5G communication system, in the frequency band of 6 GHz or lower, a subcarrier spacing (SCS) of 15 kHz 420 and a subcarrier spacing of 30 kHz 430 and 440 may be used for transmission of a synchronization signal block. There is a transmission case of FIG. 4A (case #1 401) with the subcarrier spacing of 15 kHz for a synchronization signal block, and there are two transmission cases of FIG. 4B and FIG. 4C (case #2 402 and case #3 403) with the subcarrier spacing of 30 kHz for a synchronization signal block.

In case #1 401 with the subcarrier spacing of 15 kHz 420, up to two synchronization signal blocks may be transmitted within a time of 1 ms 404 (corresponding to the length of one slot when one slot includes 14 OFDM symbols). In an example of FIG. 4, synchronization signal block #0 407 and synchronization signal block #1 408 are illustrated. Here, synchronization signal block #0 407 may be mapped to four consecutive symbols from a third OFDM symbol of a slot, and synchronization signal block #1 408 may be mapped to four consecutive symbols from a ninth OFDM symbol of the slot.

Different analog beams may be applied to synchronization signal block #0 407 and synchronization signal block #1 408. Accordingly, the same beam may be applied to all of the third to sixth OFDM symbols to which synchronization signal block #0 407 is mapped, and the same beam may be applied to all of the ninth to twelfth OFDM symbols to which synchronization signal block #1 408 is mapped. A base station may freely determine which beam to use for seventh, eighth, thirteenth, and fourteenth OFDM symbols to which no synchronization signal block is mapped.

In case #2 402 with the subcarrier spacing of 30 kHz 430, up to two synchronization signal blocks may be transmitted within a time of 0.5 ms 405 (corresponding to the length of one slot when one slot includes 14 OFDM symbols), and accordingly up to four synchronization signal blocks may be transmitted within a time of 1 ms (corresponding to the length of two slots when one slot includes 14 OFDM symbols). An example of FIG. 4 shows that synchronization signal block #0 409, synchronization signal block #1 410, synchronization signal block #2 411, and synchronization signal block #3 412 are transmitted in 1 ms (i.e., two slots). Here, synchronization signal block #0 409 and synchronization signal block #1 410 may be mapped to from a fifth OFDM symbol and a ninth OFDM symbol of a first slot, respectively, and synchronization signal block #2 411 and synchronization signal block #3 412 may be mapped to from a third OFDM symbol and a seventh OFDM symbol of a second slot, respectively.

Different analog beams may be applied to synchronization signal block #0 409, synchronization signal block #1 410, synchronization signal block #2 411, and synchronization signal block #3 412. Accordingly, the same analog beams may be respectively applied to the fifth to eighth OFDM symbols of the first slot in which synchronization signal block #0 409 is transmitted, the ninth to twelfth OFDM symbols of the first slot in which synchronization signal block #1 410 is transmitted, the third to sixth symbols of the second slot in which synchronization signal block #2 411 is transmitted, and the seventh to tenth symbols of the second slot in which the synchronization signal block #3 412 is transmitted. The base station may freely determine which beam to use for OFDM symbols to which no synchronization signal block is mapped.

In case #3 403 with the subcarrier spacing of 30 kHz 440, up to two synchronization signal blocks may be transmitted within a time of 0.5 ms 406 (corresponding to the length of one slot when one slot includes 14 OFDM symbols), and accordingly up to four synchronization signal blocks may be transmitted within a time of 1 ms (corresponding to the length of two slots when one slot includes 14 OFDM symbols). An example of FIG. 4 shows that synchronization signal block #0 413, synchronization signal block #1 414, synchronization signal block #2 415, and synchronization signal block #3 416 are transmitted in 1 ms (i.e., two slots). Here, synchronization signal block #0 413 and synchronization signal block #1 414 may be mapped to from a third OFDM symbol and a ninth OFDM symbol of a first slot, respectively, and synchronization signal block #2 415 and synchronization signal block #3 416 may be mapped to from a third OFDM symbol and a ninth OFDM symbol of a second slot, respectively.

Different analog beams may be respectively used for synchronization signal block #0 413, synchronization signal block #1 414, synchronization signal block #2 415, and synchronization signal block #3 416. As described above, the same analog beam may be used for four OFDM symbols in which each synchronization signal block is transmitted, and the base station may freely determine which beam to use for OFDM symbols to which no synchronization signal block is mapped.

Figure 5:
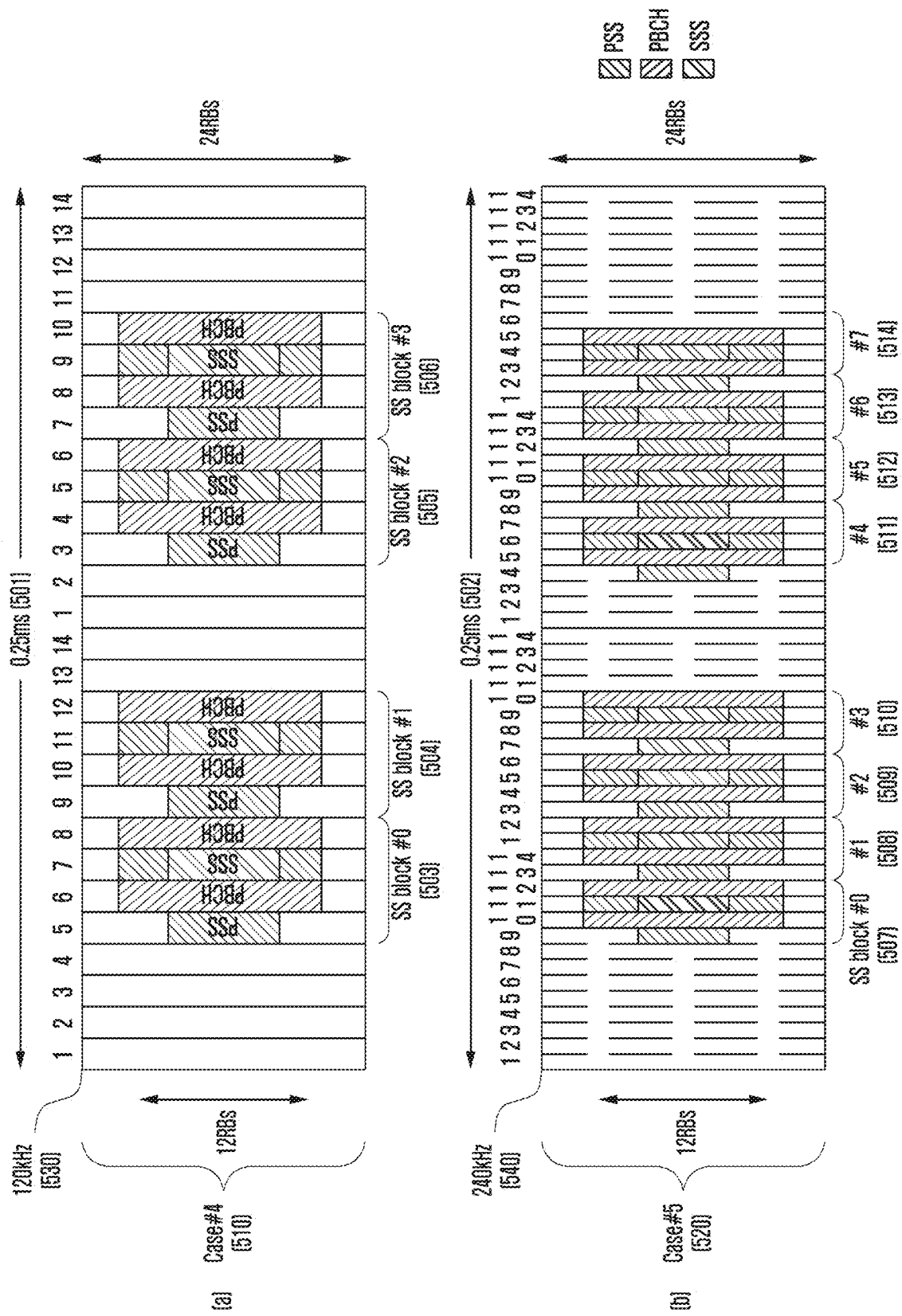
FIG. 5 illustrates transmission of a synchronization signal block in a frequency band of 6 GHz or higher considered in a 5G communication system in connection with an embodiment of the disclosure.

FIG. 5 illustrates transmission cases of a synchronization signal block in a frequency band of 6 GHz or higher considered in a 5G communication system. In the 5G communication system, in the frequency band of 6 GHz or higher, a subcarrier spacing of 120 kHz 530 and a subcarrier spacing of 240 kHz 540 may be used for transmission of a synchronization signal block.

In case #4 510 with the subcarrier spacing of 120 kHz 530 illustrated in FIG. 5A, up to four synchronization signal blocks may be transmitted with a time of 0.25 ms 501 (corresponding to the length of two slots when one slot includes 14 OFDM symbols). An example of FIG. 5A shows that synchronization signal block #0 503, synchronization signal block #1 504, synchronization signal block #2 505, and synchronization signal block #3 506 are transmitted in 0.25 ms (i.e., two slots). Here, synchronization signal block #0 503 and synchronization signal block #1 504 may be mapped to from a fifth OFDM symbol and a ninth OFDM symbol of a first slot, respectively, and synchronization signal block #2 505 and synchronization signal block #3 506 may be mapped to from a third OFDM symbol and a seventh OFDM symbol of a second slot, respectively.

As described above, different analog beams may be respectively used for synchronization signal block #0 503, synchronization signal block #1 504, synchronization signal block #2 505, and synchronization signal block #3 506. The same analog beam may be used for four OFDM symbols in which each synchronization signal block is transmitted, and a base station may freely determine which beam to use for OFDM symbols to which no synchronization signal block is mapped.

In case #5 520 with the subcarrier spacing of 240 kHz 540 illustrated in FIG. 5B, up to eight synchronization signal blocks may be transmitted with a time of 0.25 ms 502 (corresponding to the length of four slots when one slot includes 14 OFDM symbols). An example of FIG. 5B shows that synchronization signal block #0 507, synchronization signal block #1 508, synchronization signal block #2 509, synchronization signal block #3 510, synchronization signal block #4 511, synchronization signal block #5 512, synchronization signal block #6 513, and synchronization signal block #7 514 are transmitted in 0.25 ms (i.e., four slots). Here, synchronization signal block #0 507 and synchronization signal block #1 508 may be respectively mapped to from a ninth OFDM symbol and a thirteenth OFDM symbol of a first slot, synchronization signal block #2 509 and synchronization signal block #3 510 may be respectively mapped to from a third OFDM symbol and a seventh OFDM symbol of a second slot, synchronization signal block #4 511, synchronization signal block #5 512, and synchronization signal block #6 513 may be respectively mapped to from a fifth OFDM symbol, a ninth OFMD symbol, and a thirteenth OFDM symbol of a third slot, and synchronization signal block #7 514 may be mapped to from a third OFDM symbol of a fourth slot.

As described above, different analog beams may be respectively used for synchronization signal block #0 507, synchronization signal block #1 508, synchronization signal block #2 509, synchronization signal block #3 510, synchronization signal block #4 511, synchronization signal block #5 512, synchronization signal block #6 513, and synchronization signal block #7 514. The same analog beam may be used for four OFDM symbols in which each synchronization signal block is transmitted, and the base station may freely determine which beam to use for OFDM symbols to which no synchronization signal block is mapped.

Figure 6:
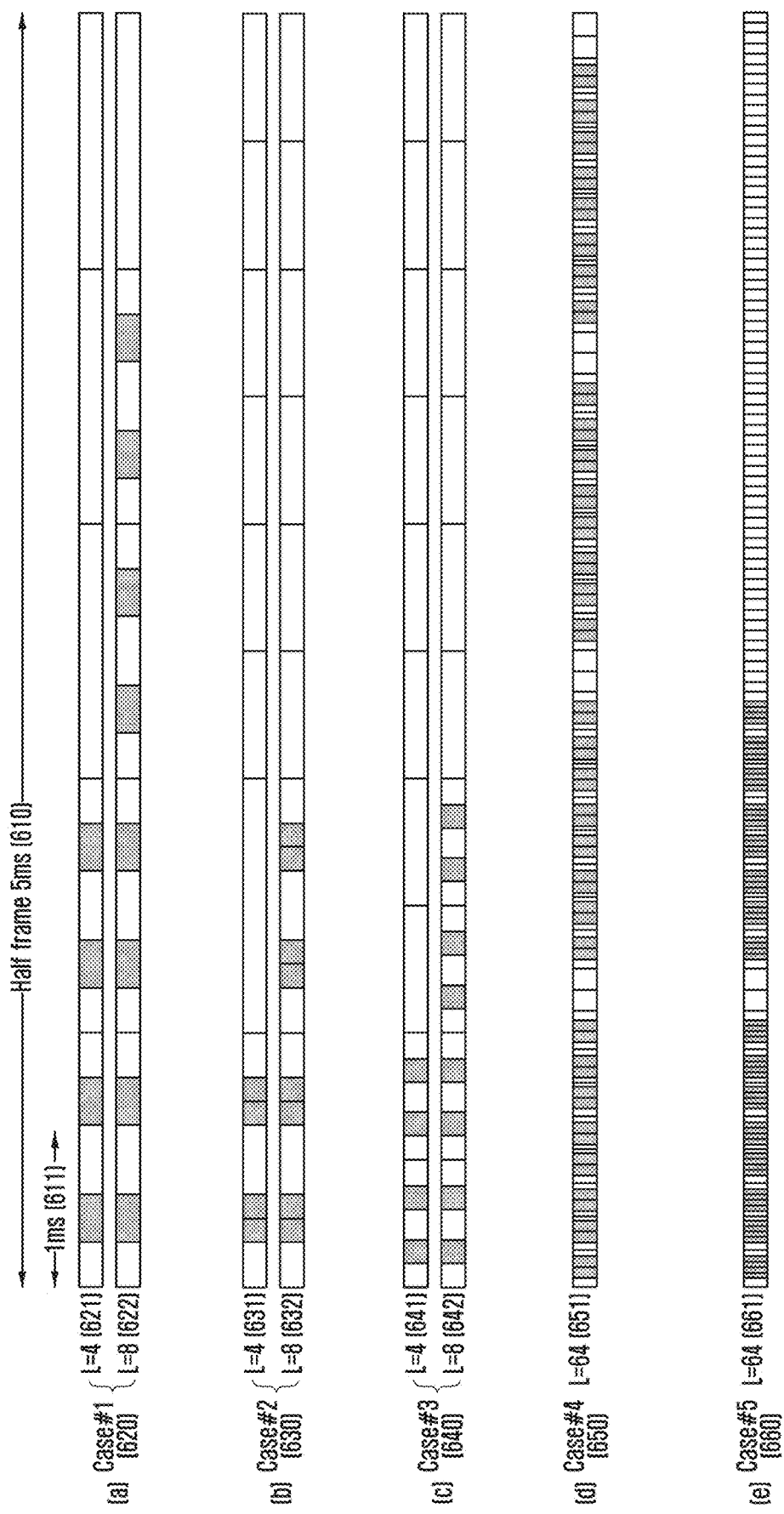
FIG. 6 illustrates transmission cases of a synchronization signal block according to subcarrier spacing within a time of 5 ms in connection with an embodiment of the disclosure.

FIG. 6 illustrates transmission cases of a synchronization signal block according to subcarrier spacing within a time of 5 ms. In a 5G communication system, a synchronization signal block is periodically transmitted every 5 ms (corresponding to five subframes or a half frame) 610.

In a frequency band of 3 GHz or less, up to four synchronization signal blocks may be transmitted within the time of 5 ms 610. In a frequency band ranging from 3 GHz to 6 GHz, up to eight synchronization signal blocks may be transmitted within the time of 5 ms 610. In a frequency band of 6 GHz or higher, up to 64 synchronization signal blocks may be transmitted within the time of 5 ms 610. As described above, a subcarrier spacing of 15 kHz and a subcarrier spacing of 30 kHz may be used at frequencies of 6 GHz or less.

An example of FIG. 6A shows an embodiment to which case #1 401 with the subcarrier spacing of 15 kHz configured with one slot of FIG. 4 is applied. Referring to FIG. 6A, in the frequency band of 3 GHz or less, synchronization signal blocks may be mapped to a first slot and a second slot, and thus up to four synchronization signal blocks 621 may be transmitted, and in the frequency band ranging from 3 GHz to 6 GHz, synchronization signal blocks may be mapped to first, second, third, and fourth slots, and thus up to eight synchronization signal blocks 622 may be transmitted.

Example of FIG. 6B and FIG. 6C show embodiments to which case #2 402 or case #3 403 with the subcarrier spacing of 30 kHz configured with two slots of FIG. 4 is applied. Referring to FIG. 6B and FIG. 6C, in the frequency band of 3 GHz or less, synchronization signal blocks may be mapped to from a first slot, and thus up to four synchronization signal blocks 631 and 641 may be transmitted, and in the frequency band ranging from 3 GHz to 6 GHz, synchronization signal blocks may be mapped to from first and third slots, and thus up to eight synchronization signal blocks 632 and 642 may be transmitted.

A subcarrier spacing of 120 kHz and a subcarrier spacing of 240 kHz may be used at a frequency of 6 GHz of higher. In an example of FIG. 6D to which case #4 510 with the subcarrier spacing of 120 kHz configured with two slots of FIG. 5 is applied, synchronization signal blocks may be mapped to from 1st, 3rd, 5th, 7th, 11th, 13th, 15th, 17th, 21st, 23rd, 25th, 27th, 31st, 33rd, 35th, and 37th slots in the frequency band of 6 GHz or higher, and thus up to 64 synchronization signal blocks 651 may be transmitted. In an example of FIG. 6E to which case #5 520 with the subcarrier spacing of 240 kHz configured with four slots of FIG. 5 is applied, synchronization signal blocks may be mapped to from 1st, 5th, 9th, 13th, 21st, 25th, 29th, and 33rd slots in the frequency band of 6 GHz or higher, and thus up to 64 synchronization signal blocks 661 may be transmitted.

In an LTE communication system, machine-type communication (LTE-MTC) has been developed to support an application service, such as Internet of Things (IoT). LTE-MTC is an IoT-only access technology in which a low-power design, low-cost equipment supply, low construction cost, stable coverage, and large-scale terminal access implementation are considered as key requirements. LTE-MTC may guarantee a long battery life of a terminal by reducing a transmission speed and a transmission bandwidth, compared to an LTE service, and using a low-power design adopting a power saving mode. Further, complexity of a communication modem is substantially reduced due to a substantially reduced transmission speed and transmission bandwidth, making it possible to implement a low-cost terminal. In addition, it is possible to apply a single antenna technology instead of a multi-antenna (MIMO) technology, thereby minimizing power consumption. Furthermore, an existing LTE network can be used as it is, thus supporting both an existing LTE service and an LTE-MTC service without additional investment.

Here, to exert no impact on a terminal provided with the existing LTE service, additional information is included in a remaining bit of an MIB included in a PBCH for the existing LTE service, thereby indicating that a cell transmitting the PBCH also supports the LTE-MTC service and further indirectly indicating a resource position in which system information block type 1-bandwidth reduced (SIB1-BR) for the LTE-MTC service is transmitted. Accordingly, the terminal or nodes provided with the LTE-MTC service may determine whether a cell found through a cell search is a cell supporting the LTE-MTC service, and may obtain the position of a resource for receiving the corresponding system information block when the cell also supports the LTE-MTC service. In addition, the terminal provided with the existing LTE service may receive the LTE service without an additional operation or a new operation in addition to an existing operation.

Figure 7:
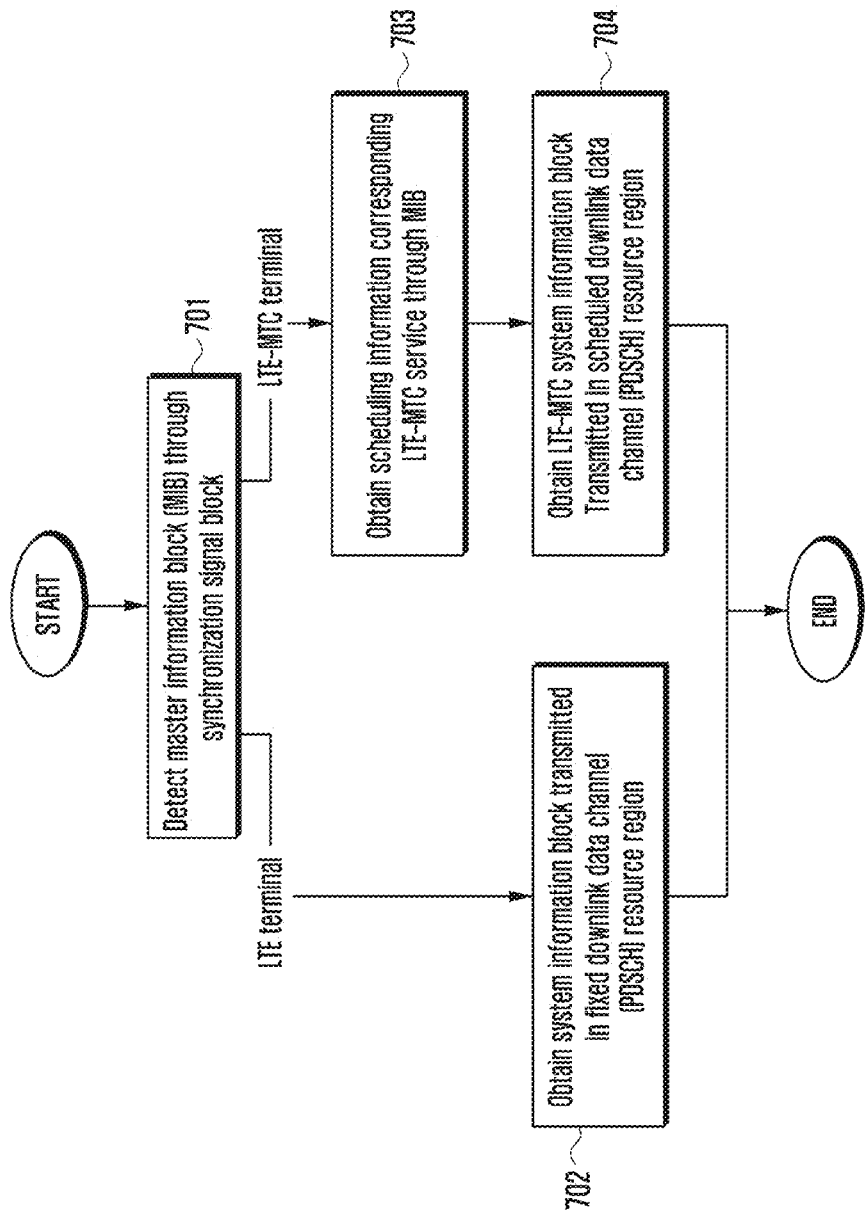
FIG. 7 illustrates a procedure for transmitting and receiving system information about an LTE service and an LTE-MTC service in connection with an embodiment of the disclosure.

FIG. 7 illustrates a procedure for transmitting and receiving system information about an LTE service and an LTE-MTC service. Referring to FIG. 7, in the LTE service, a base station periodically transmits a synchronization signal and a PBCH to a plurality of terminals in a system, and a terminal obtains time and frequency synchronization through the synchronization signal and is provided with an MIB, which is essential system information, through the PBCH (701). Operation 701 is performed by both an LTE terminal and an LTE-MTC terminal. Subsequently, the LTE terminal receives various pieces of system information called a system information block (SIB) in a fixed resource region (or PDSCH transmission region) for receiving a downlink data channel (physical downlink shared channel: PDSCH) (702).

The LTE-MTC terminal obtains scheduling information (e.g., the number of repetitions and a transport block size (TBS)) corresponding to the additional LTE-MTC service included in the MIB. The LTE-MTC terminal may determine a resource position, based on the scheduling information and may receive a PDSCH in the resource position, thereby receiving various pieces of system information called a system information block corresponding to the LTE-MTC service (704).

In a 5G communication system, an mMTC service is taken into consideration to support an application service, such as Internet of Things (IoT). In the mMTC service, to efficiently provide the IoT, it is required to support large-scale terminal access within a cell, to improve terminal coverage, to improve a battery life, and to reduce terminal cost. In particular, to reduce cost of a terminal supporting the mMTC service, it may be mainly required to reduce a minimum transmission bandwidth required for the terminal. Here, to reduce additional investment, it is required to support both an existing 5G communication service and the mMTC service in one 5G cell. That is, it is required to support both terminals having an existing transmission bandwidth and terminals having a relatively small transmission bandwidth in one 5G cell, and a terminal provided with the existing 5G communication service needs to be provided with the 5G communication service without an additional operation or a new operation in addition to an existing operation.

Figure 8:
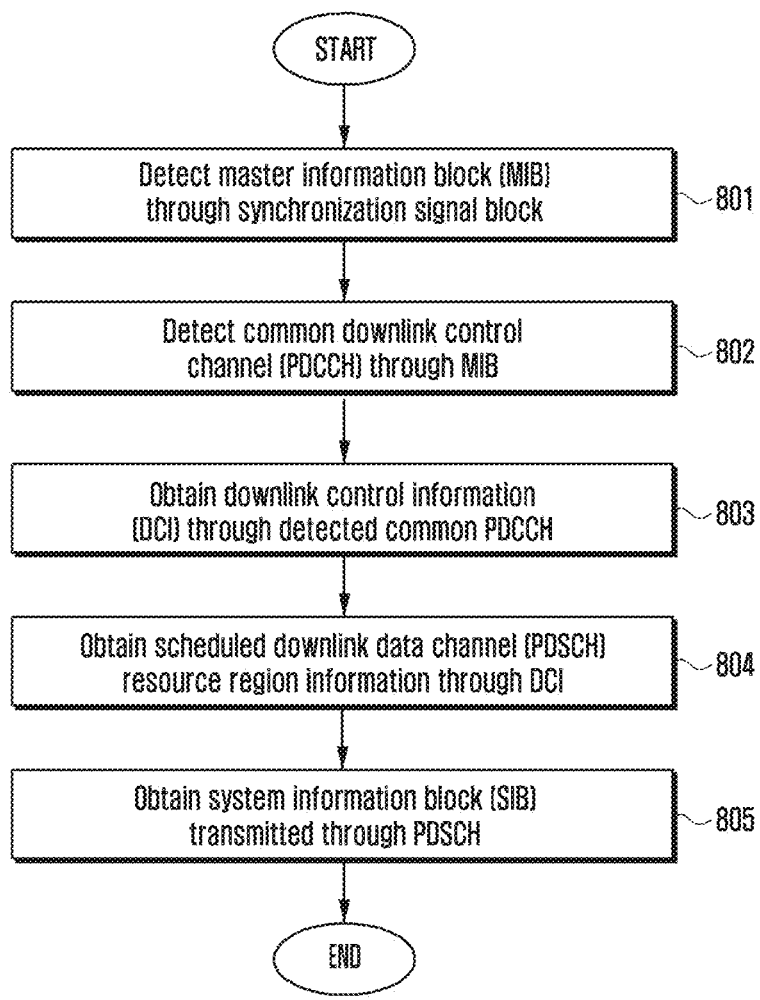
FIG. 8 illustrates a procedure for transmitting and receiving system information about a 5G mobile communication service in connection with an embodiment of the disclosure.

FIG. 8 illustrates a procedure for transmitting and receiving system information about a 5G mobile communication service. Referring to FIG. 8, a base station periodically transmits a synchronization signal block including a synchronization signal and a PBCH to a plurality of terminals in a system, and a terminal obtains time and frequency synchronization through the synchronization signal included in the synchronization signal block and receives an MIB, which is essential system information, through the PBCH (801). The terminal monitors or retrieves a common physical downlink control channel (common PDCCH) in a common downlink control channel region (hereinafter, a CORESET or a search space), based on time-domain and frequency-domain information indicated through the MIB (802). When the terminal detects the common PDCCH, the terminal obtains downlink control information (DCI) transmitted from the base station through the detected common PDCCH (803). The terminal may obtain scheduling information on a downlink data channel or an uplink data channel through the received DCI information. That is, the DCI may include information on a resource region (or PDSCH transmission region) for the terminal to receive a PDSCH transmitted from the base station or information on a resource region allocated by the base station for the terminal to transmit a physical uplink shared channel (PUSCH). The DCI obtained in operation 803 includes information on a PDSCH transmission region for the base station to transmit a SIB, and the terminal obtains the information on the PDSCH transmission region from the DCI (804). Various pieces of system information called a system information block (SIB) may be transmitted in a scheduled PDSCH, and the terminal obtains the SIB (805).

Figure 9:
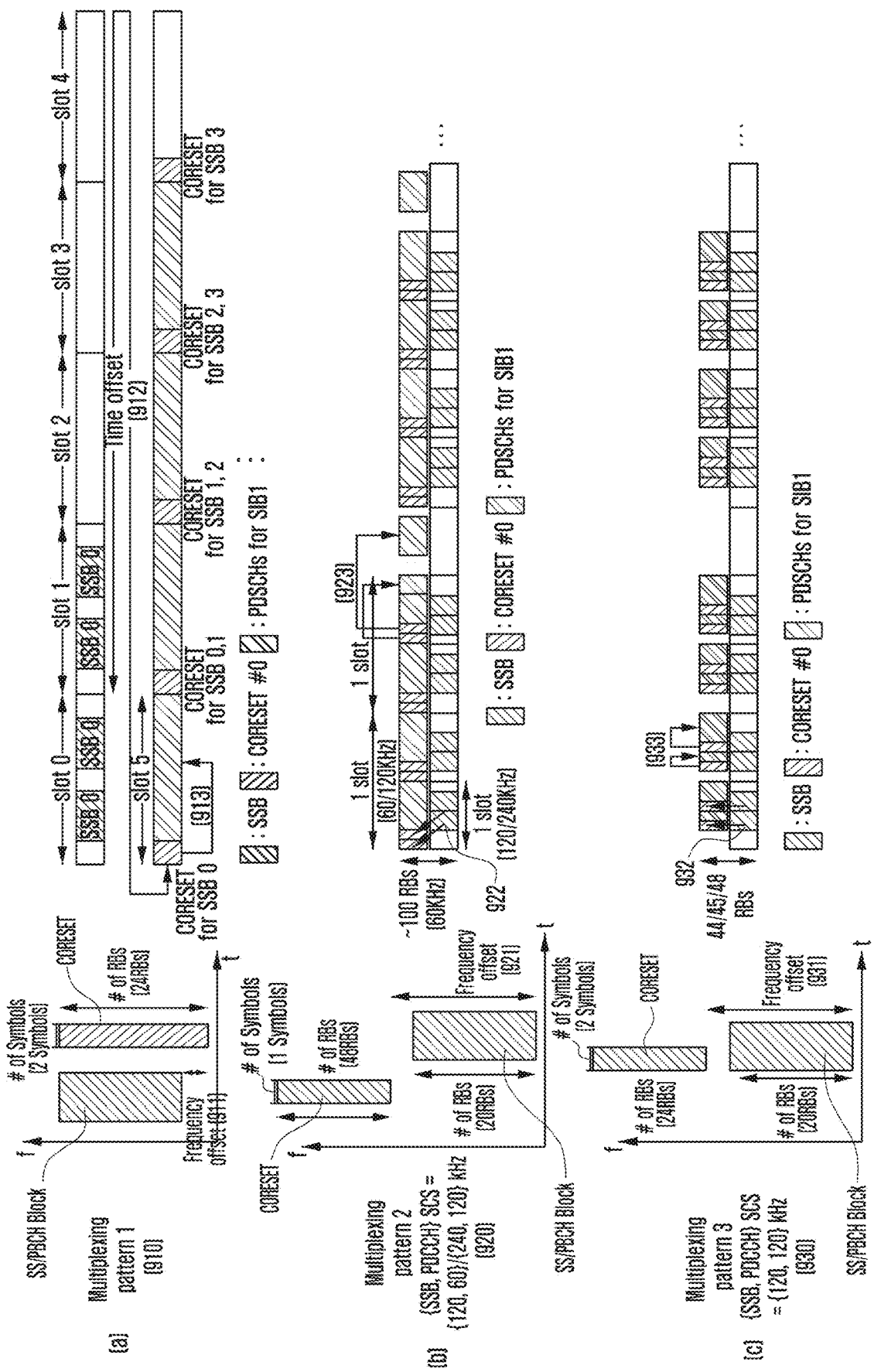
FIG. 9 illustrates embodiments of a method of indicating whether a massive machine-type communication (mMTC) system information block (SIB) exists using a physical broadcast channel (PBCH) payload in connection with an embodiment of the disclosure.

FIG. 9 illustrates multiplexing patterns between a synchronization signal block and a CORESET. The common downlink control channel region (CORESET) indicated through the MIB in the procedure 802 for transmitting and receiving the system information described above with reference to FIG. 8 may have three multiplexing patterns according to a position relative to the synchronization signal block. In an example of FIG. 9A, in frequency range 1 (FR1), an SSB-CORESET multiplexing pattern is subjected to time division multiplexing (TDM) (910). The position of a CORESET based on an SSB has a pattern of being multiplexed in the time domain, and CORESET resources are allocated in two consecutive slots. Specifically, an offset 911 by a unit of an RB between the SSB and the CORESET in the frequency domain and an offset 912 by a unit of a slot and the start symbol position of the CORESET in the time domain are determined based on values included in an MIB. Here, a PDSCH scheduled by downlink control information of a PDCCH detected in the CORESET exists in a slot including the CORESET (913).

In an example of FIG. 9B, in frequency range 2 (FR2), an SSB-CORESET multiplexing pattern is subjected to both TDM and frequency division multiplexing (FDM) (920). The position of a CORESET based on an SSB has a pattern of being multiplexed in the time and frequency domains, and CORESET resources are allocated in one slot. Specifically, an offset 921 by a unit of an RB between the SSB and the CORESET in the frequency domain and the system frame and slot numbers of the CORESET and the start symbol position of the CORESET in the time domain are determined based on values included in an MIB (922). Here, a PDSCH scheduled by downlink control information of a PDCCH detected in the CORESET exists in a slot including the CORESET or in a next slot (923).

In an example of FIG. 9C, in frequency range 2 (FR2), an SSB-CORESET multiplexing pattern is subjected to FDM (930). The position of a CORESET based on an SSB has a pattern of being multiplexed in the frequency domain, and CORESET resources are allocated in one slot. Specifically, an offset 931 by a unit of an RB between the SSB and the CORESET in the frequency domain and the system frame and slot numbers of the CORESET and the start symbol position of the CORESET in the time domain are determined based on a value included in an MIB (932). Here, a start symbol of the CORESET indicated in the time domain matches a start symbol of the SSB. In addition, a PDSCH scheduled by downlink control information of a PDCCH detected in the CORESET exists in a slot including the CORESET (933).

In the 5G mobile communication service, as a center frequency generally increases, coverage of a base station and a terminal is reduced, and thus coverage enhancement is a key requirement. In particular, in frequency range 2 (FR2), the coverage of the base station and the terminal is rapidly reduced as the center frequency increased rapidly. To enhance the coverage of the base station and the terminal, since data including an essential system information block needs to be successfully received for connection of the base station and the terminal, it is particularly important to enhance the coverage for the system information block. In a representative method among methods for coverage enhancement, data including a system information block needs to have a small coding rate or to obtain a power gain as a payload size is small or a time-domain resource is configured to be wide. However, the data for transmitting the system information block is essential data and thus has a determined minimum payload size. Therefore, a fundamental method for coverage enhancement may be configuring a wide time-domain resource with a fixed payload size. As described above with reference to FIG. 9, except for SSB-CORESET multiplexing pattern 2 920, data including a system information block needs to be transmitted within a same slot, such as the corresponding CORESET. In particular, in multiplexing pattern 3 930, the SSB and CORESET are subjected to FDM, and a beam for data including a system information block needs to be the same as a scheduled PDCCH, that is, needs to be the same as a beam for a CORESET in which the PDCCH is detected and also needs to be the same as a beam for an SSB connected to the CORESET. That is, the data including the system information block cannot overlap with an SSB on the time axis. Accordingly, in FR2, the data including the system information block is inevitably transmitted in very limited time resources due to the aforementioned constraint.

Therefore, the disclosure provides a method for allocating a transmission resource for data including a system information block for enhancing coverage of a base station and a terminal in a 5G mobile communication service and various services. In addition, the disclosure provides a method for repeatedly transmitting data including a system information block.

Hereinafter, the disclosure proposes a method and an apparatus for transmitting and receiving downlink data including a system information block for coverage enhancement, but the gist of the disclosure may be applied to general downlink data and uplink data without being limited to the downlink data including the system information block, may be applied to a method and an apparatus for transmitting data for a service (e.g., URLLC) that can be provided in a 5G system other than coverage enhancement.

Embodiment 1

Embodiment 1 of the disclosure illustrates a method in which a base station allocates a resource for a data channel through which a system information block is transmitted to a terminal. As described above, the method for allocating the resource for the data channel through which the system information block is transmitted illustrated in this embodiment is a method of allocating a time resource more dynamically and flexibly than an existing method in order to enhance coverage. Specifically, in a related art, a resource for transmitting a data channel through which a system information block is transmitted is limited according to a specified relationship between a synchronization signal block and a CORSET. For example, in multiplexing pattern 3 in the frequency range FR2, a time resource for transmitting a data channel through which a system information block is transmitted is up to two OFDM symbols (when all synchronization signal blocks are actually transmitted). Here, since the minimum data size of the system information block is determined and the system information block is very important information, it is necessary to increase time resources as described above in order to enhance coverage. Accordingly, the disclosure proposes a method for dynamically and flexibly allocating a resource in order to enhance coverage of data in which a system information block is transmitted.

The following method may be considered as a method of allocating a resource in order to enhance coverage of data in which a system information block is transmitted.

Embodiment 1-1

The base station may flexibly allocate a resource for a PDSCH including a system information block to the terminal. As described above, a resource for transmitting a data channel through which a system information block is transmitted is limited according to a specified relationship between a synchronization signal block and a CORSET. Specifically, a CORESET and a data channel through which a system information block is transmitted need to be allocated in the same slot 933 as the CORESET or a slot after the CORESET. In addition, there is a restrictive condition that a CORESET corresponding to a synchronization signal block and a data channel need to be transmitted in a resource overlapping the synchronization signal block in the time domain. Accordingly, in the frequency range FR2, a time resource for transmitting a data channel through which a system information block is transmitted is up to two OFDM symbols (when all synchronization signal blocks are actually transmitted). Therefore, in order to solve this problem, a method for flexibly configuring an offset between a CORESET and a data channel through which a system information block is transmitted through L1 signaling (e.g., downlink control information included in the corresponding CORESET), a mutually agreed offset, or an MIB (master information block) is proposed.

Figure 10:
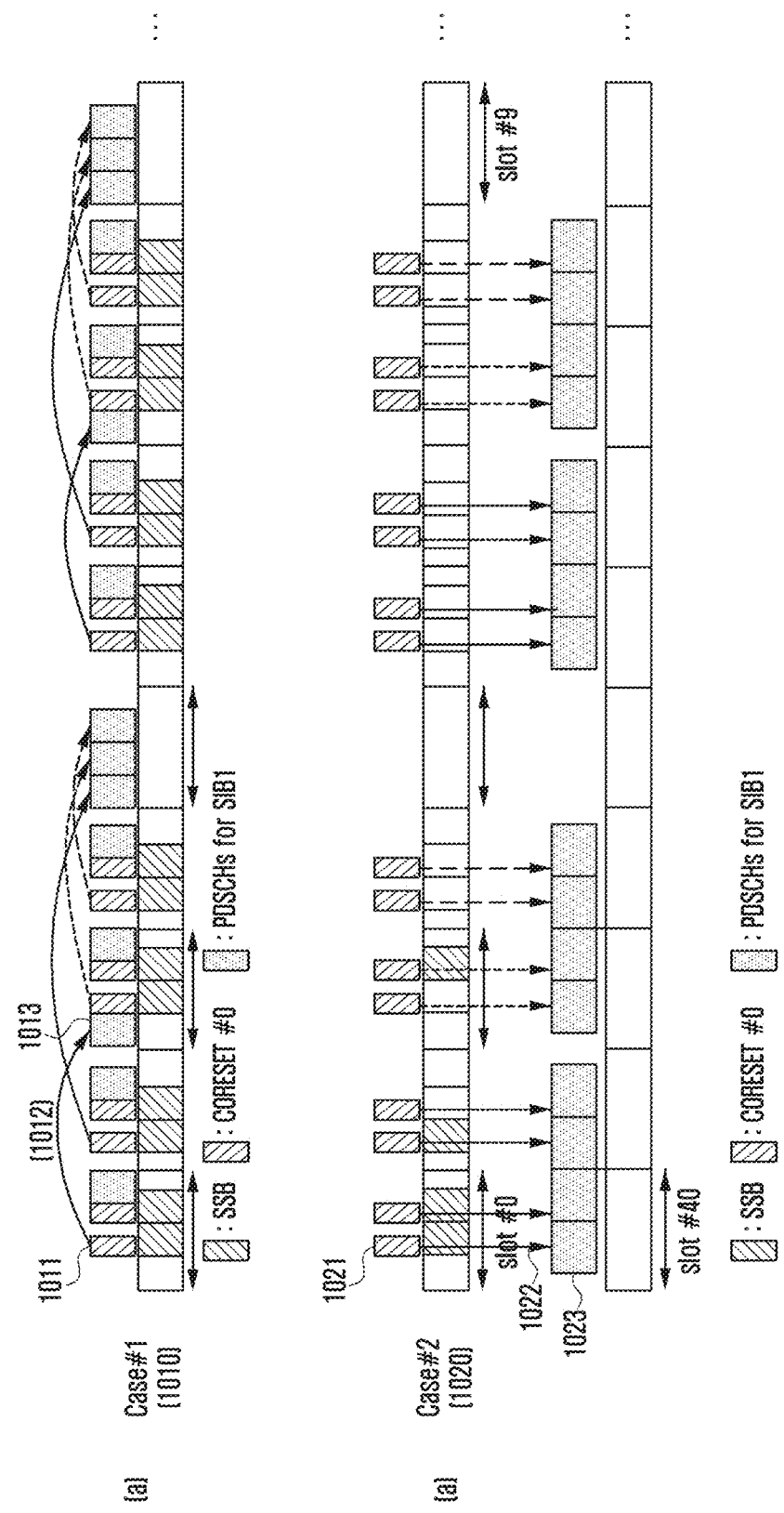
FIG. 10 illustrates an embodiment in which a terminal obtains system information in connection with an embodiment of the disclosure.

FIG. 10 illustrates a method of configuring a resource through an offset between a CORESET and a data channel through which a system information block is transmitted according to the foregoing embodiment. When an offset between a CORESET and a PDSCH is dynamically configured when the SCS of the SSB and the CORESET is 120 kHz in the frequency range FR2, a resource for the PDSCH including SIB1 may be configured as in case #1 1010 of FIG. 10A. In FIG. 10A, when the CORESET 1011 corresponding to a first SSB configures an offset between the CORESET and the PDSCH to two slots 1012, the offset may be applied, so that four OFDM symbols are allocated for the resource for the PDSCH 1013 including SIB1. These four OFDM symbols are a sufficiently large number of radio resources compared to two limited OFDM symbols described above.

As illustrated in FIG. 10B, when the offset between the CORESET and the PDSCH is configured to a mutually agreed value (or a preset value) when the SCS of the SSB and the CORESET is 120 kHz in the frequency range FR2, a resource for the PDSCH including SIB1 may be configured as in case #2 1020 of FIG. 10B. In FIG. 10B, when the CORESET 1021 corresponding to a first SSB configures an offset between the CORESET and the PDSCH to 40 slots 1022, the offset may be applied, so that six OFDM symbols are allocated for the resource for the PDSCH 1023 including SIB1. Unlike in case #1 1010, since the offset between the CORESET and the PDSCH is mutually agreed, all offsets between CORESETs and PDSCHs are 40 slots. These six OFDM symbols are radio resources more than those in the embodiment described with reference to FIG. 10A.

The method is not limited as a single method for transmitting and receiving a data channel through which a system information block is transmitted but may be combined with a method of repeatedly transmitting a data channel through which a system information block is transmitted according to embodiment 2 to be described below, thereby transmitting and receiving a data channel in which a system information block is transmitted.

Embodiment 2

Embodiment 2 of the disclosure illustrates a method in which a base station repeatedly transmits a data channel through which a system information block is transmitted to a terminal. Specifically, a resource for transmitting a data channel through which a system information block is transmitted is limited according to a specified relationship between a synchronization signal block and a CORSET. As described above, a CORESET and a data channel through which a system information block is transmitted need to be allocated in the same slot or a next slot according to a multiplexing pattern, and there is a restrictive condition that a CORESET corresponding to a synchronization signal block and a data channel need to be transmitted for beam matching in a resource overlapping the synchronization signal block in the time domain. Accordingly, in multiplexing pattern 3 in the frequency range FR2, a time resource for transmitting a data channel through which a system information block is transmitted is up to two OFDM symbols (when all synchronization signal blocks are actually transmitted). Here, since the minimum data size of the system information block is determined and the system information block is very important information, it is necessary to increase time resources as described above in order to enhance coverage. Accordingly, the disclosure proposes a method for repeatedly transmitting a system information block in order to enhance coverage of data in which the system information block is transmitted.

The following embodiments may be considered as methods for repeating transmission in order to enhance coverage of data in which a system information block is transmitted.

Embodiment 2-1

The base station may repeatedly transmit a PDSCH corresponding to one synchronization signal block and transmitting a system information block. As described above, a resource for transmitting a data channel through which a system information block is transmitted is limited according to a specified relationship between a synchronization signal block and a CORSET. Specifically, a CORESET and a data channel through which a system information block is transmitted need to be allocated in the same slot or a next slot, and there is a restrictive condition that a CORESET corresponding to a synchronization signal block and a data channel need to be transmitted for beam matching in a resource overlapping the synchronization signal block in the time domain. Accordingly, in the frequency range FR2, a time resource for transmitting a data channel through which a system information block is transmitted is up to two OFDM symbols (when all synchronization signal blocks are actually transmitted). Therefore, in order to solve this problem, the base station repeatedly transmits a PDSCH including a system information block, and the terminal receiving the repeatedly transmitted PDSCH may combine and decode or receive the received one or more PDSCHs. Accordingly, the terminal may improve performance of detecting the system information block. As described above, since the resource configuration of the PDSCH including the system information block is very limited, the base station may repeatedly configure a transmission resource for the PDSCH including the system information block by configuring one or more of the following pieces of information.

Information about number of repetitions

Information about time resource offset between PDCCH and PDSCH (in slots, in symbols, or in frames)

Information about start OFDM symbol position of PDSCH resource and information about OFDM symbol length Information about frequency resource for PDSCH The foregoing pieces of information may be transmitted by the base station to the terminal through L1 signaling (downlink channel) or a master information block (MIB), or may be configured to a value agreed between the terminal and the base station or a preset value.

Here, the following embodiments may be considered as methods for the base station to repeatedly transmit a PDSCH corresponding to one synchronization signal block and transmitting a system information block.

Embodiment 2-1-1

A PDSCH corresponding to one synchronization signal block and transmitting a system information block may be repeatedly transmitted in consecutive slots. Specifically, in configuring a PDSCH resource, the base station may repeatedly and flexibly transmit the PDSCH through which the system information block is transmitted in consecutive slots through information about the number of repetitions and information about a time resource offset (in slots, in symbols, or in frames) between a PDCCH and the PDSCH. The information about the number of repetitions and the information about the time resource offset between the PDCCH and the PDSCH may be configured to a previously agreed value or may be dynamically configured in the terminal through L1 signaling (e.g., DCI).

Figure 11:
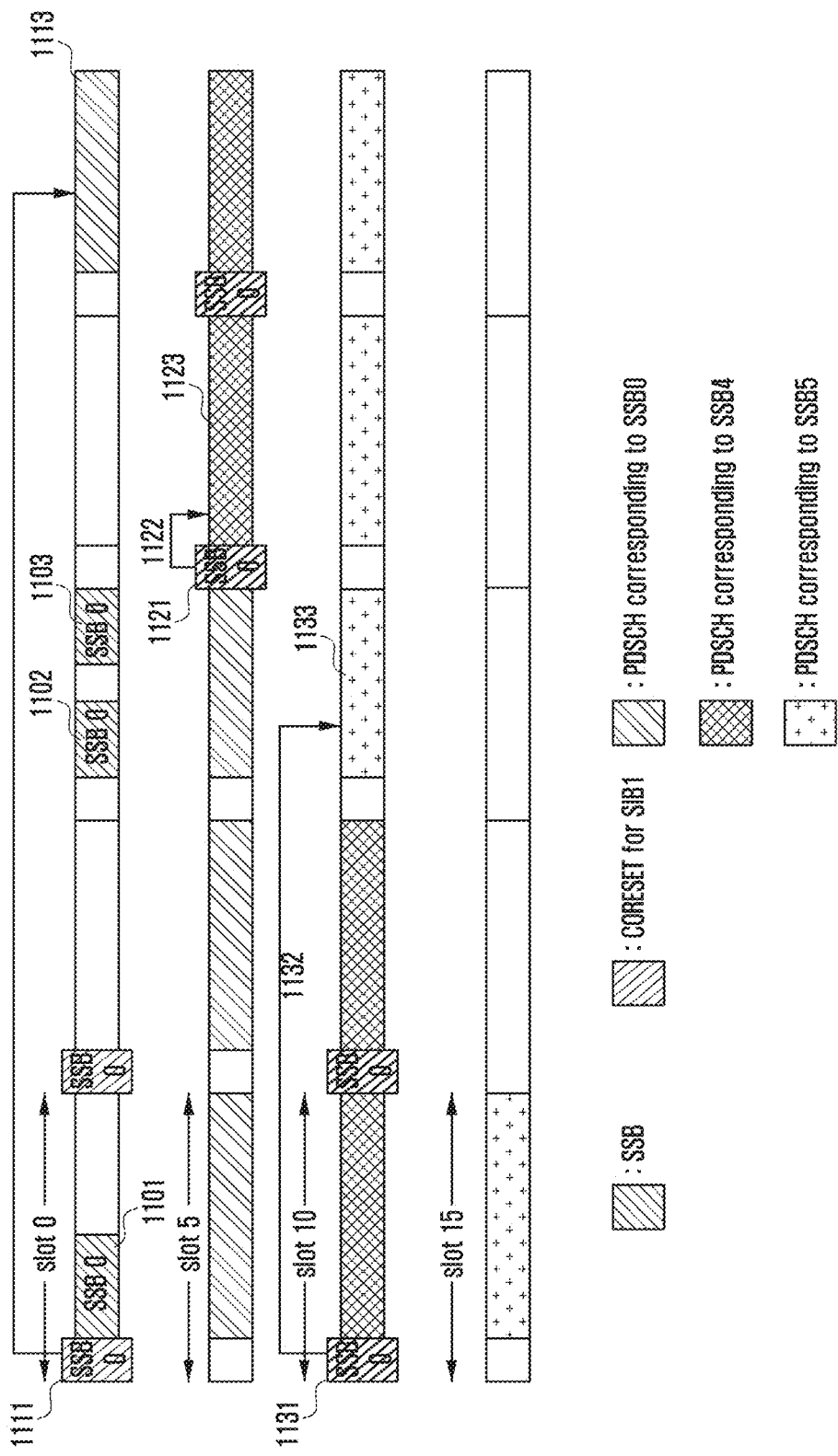
FIG. 11 illustrates an embodiment in which a terminal obtains system information in connection with an embodiment of the disclosure.

FIG. 11 illustrates an embodiment in which a base station repeatedly transmits a PDSCH through which a system information block is transmitted. When the SCS of an SSB and a CORESET is 15 kHz in the frequency range FR1, the positions of the SSB and the CORESET may be configured as illustrated in FIG. 11. In the embodiment of FIG. 11, the base station may actually transmit only SSB #0 1101, SSB #4 1102, and SSB #5 1103, and a terminal may obtain information about the SSB transmitted by the base station through an MIB. When an offset 1112 between a PDCCH and a PDSCH is configured to four slots by a CORESET 1111 configured in SSB #0 1101 and the number of repetitions is configured to 4, a PDSCH 1113 including SIB1 may be repeatedly transmitted in four consecutive slots from a slot determined by the offset 1112. Subsequently, when an offset 1122 between a PDCCH and a PDSCH is configured to zero slots by a CORESET 1121 configured in SSB #4 1102 and the number of repetitions is configured to 4, a PDSCH 1123 including SIB1 may be repeatedly transmitted in four consecutive slots from a slot determined by the offset 1122. In addition, when an offset 1132 between a PDCCH and a PDSCH is configured to zero slots and the number of repetitions is configured to 4 by a CORESET 1131 configured in SSB #5 1103, a PDSCH 1133 including SIB1 may be repeatedly transmitted in four consecutive slots from a slot configured by the offset 1132.

Embodiment 2-1-2

The base station may repeatedly transmit a PDSCH corresponding to one synchronization signal block and transmitting a system information block according to a certain period. Specifically, in configuring a PDSCH resource, the base station may periodically and repeatedly transmit the PDSCH through which the system information block is transmitted through information about the number of repetitions and repetition period information. The information about the number of repetitions and the repetition period information may be configured to a previously agreed value or may be dynamically configured in the terminal through L1 signaling (e.g., DCI).

Figure 12:
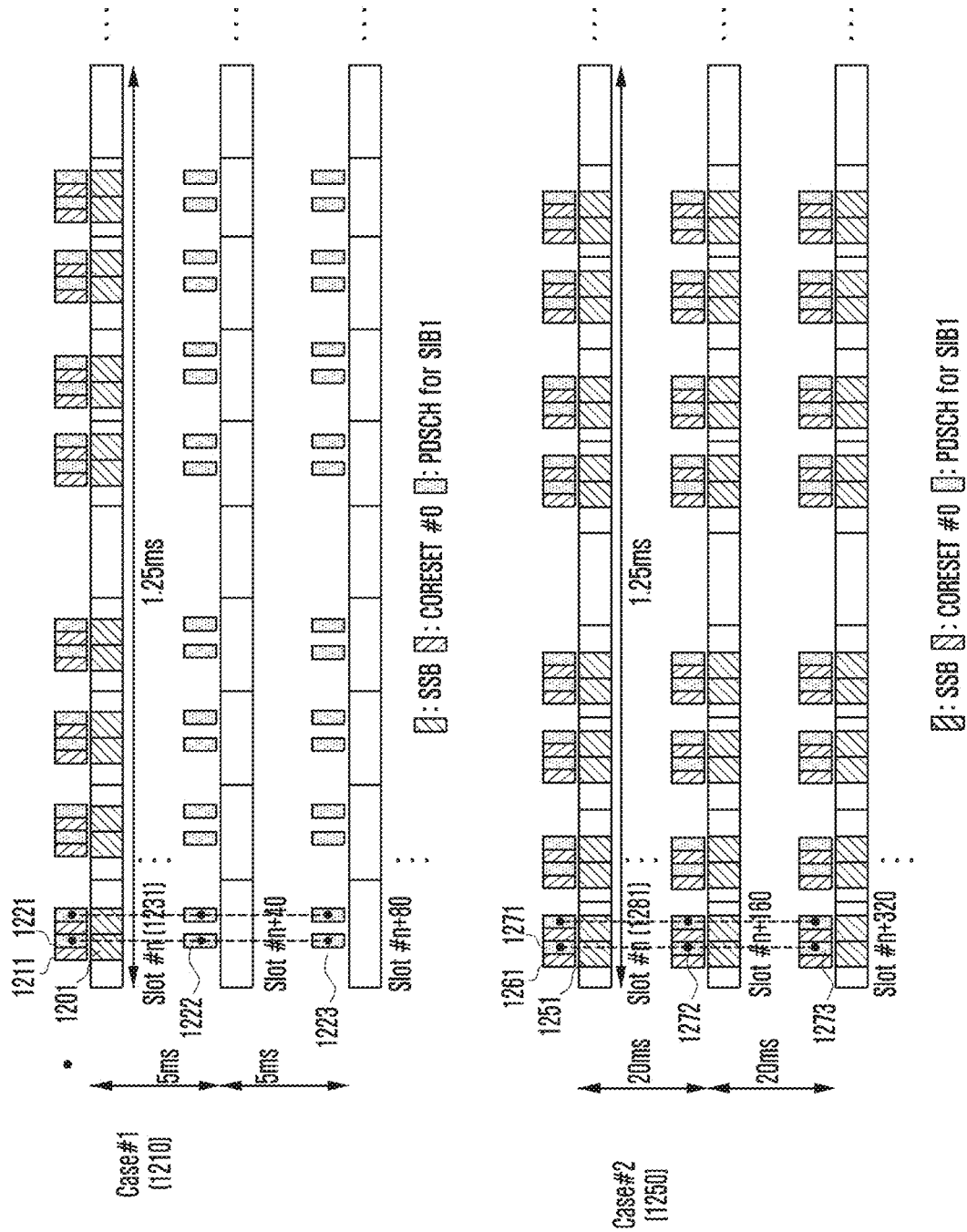
FIG. 12 illustrates an embodiment in which a terminal obtains system information in connection with an embodiment of the disclosure.

FIG. 12 illustrates an embodiment of repeatedly transmitting a PDSCH through which a system information block is transmitted. FIG. 12A illustrates a case where the SCS of an SSB and a CORESET is 120 kHz and a repetition period is 40 slots (or 5 ms) in the frequency range FR2, in which a CORESET 1211 configured in SSB #0 1201 in case #1 1210 schedules a PDSCH 1221 including SIB1, and the base station repeatedly transmits the PDSCH according to the configured repetition period 1231 and the number of repetitions (1221, 1222, and 1223). The terminal may receive a system information block from at least one of the repeatedly transmitted PDSCHs 1221, 1222, and 1223.

FIG. 12B illustrates a case where the SCS of an SSB and a CORESET is 120 kHz and a repetition period is 160 slots (or 20 ms) 1280 in the frequency range FR2, in which a CORESET 1261 configured in SSB #0 1251 in case #2 1250 schedules a PDSCH 1271 including SIB1, and the base station repeatedly transmits the PDSCH according to the configured repetition period 1281 and the number of repetitions (1271, 1272, and 1273). Here, the terminal does not need to detect a PDCCH in an SSB and a CORESET corresponding to the SSB during a period in which the PDSCH including SIB1 is repeatedly transmitted. Therefore, according to this embodiment, power for receiving and detecting a downlink signal may be reduced according to implementation of the terminal. The terminal may receive a system information block from at least one of the repeatedly transmitted PDSCHs 1271, 1272, and 1273.

Embodiment 2-2

The base station may repeatedly transmit PDSCHs corresponding to one or more synchronization signal blocks and transmitting the same system information block, and the terminal may combine and decode or receive the one or more PDSCHs through which the same system information block is transmitted. Specifically, the base station may transmit one or more PDSCHs corresponding to individual synchronization signal blocks and including a system information block on a resource defined by the same subcarrier position and the same OFDM symbol position on a plurality of slots. Accordingly, the terminal may combine and receive the one or more PDSCHs corresponding to the different synchronization signal blocks and including the system information blocks, thereby improving performance of detecting the system information block. Here, as described above, since the resource configuration of the PDSCH including the system information block is very limited, the base station may flexibly configure a transmission resource for the PDSCH including the system information block through one or more of the following pieces of information.

Information about number of repetitions

Information about time resource offset between PDCCH and PDSCH (in slots, in symbols, or in frames)

Information about start OFDM symbol position of PDSCH resource and information about OFDM symbol length Information about frequency resource for PDSCH The foregoing pieces of information may be configured by the base station for the terminal through L1 signaling (downlink channel) or a master information block (MIB), or may be configured to a value (preset value) agreed between the terminal and the base station.

Here, the following methods may be considered as methods for the base station to repeatedly transmit a PDSCH corresponding to one or more synchronization signal blocks and including a system information block.

Embodiment 2-2-1

The base station may configure each CORESET through an MIB of each synchronization signal block actually transmitted may transmit a plurality of PDSCHs that is scheduled by downlink control information detected by each CORE- SET and corresponds to a plurality of synchronization signal blocks. Specifically, the terminal does not obtain a system information block by detecting only one synchronization signal block, but detects a plurality of synchronization signal blocks actually transmitted by the base station and obtains each piece of downlink control information on a PDCCH detected in a CORESET configured through an MIB of each synchronization signal block. The terminal may combine and decode or receive all of the plurality of PDSCHs scheduled through a plurality of pieces of obtained downlink control information, thereby obtaining one system information block.

In this embodiment, each of the plurality of PDSCHs including the same system information block corresponds to each synchronization signal block actually transmitted by the base station. That is, the base station may transmit the plurality of PDSCHs including the same system information block through a plurality of beams.

Figure 13:
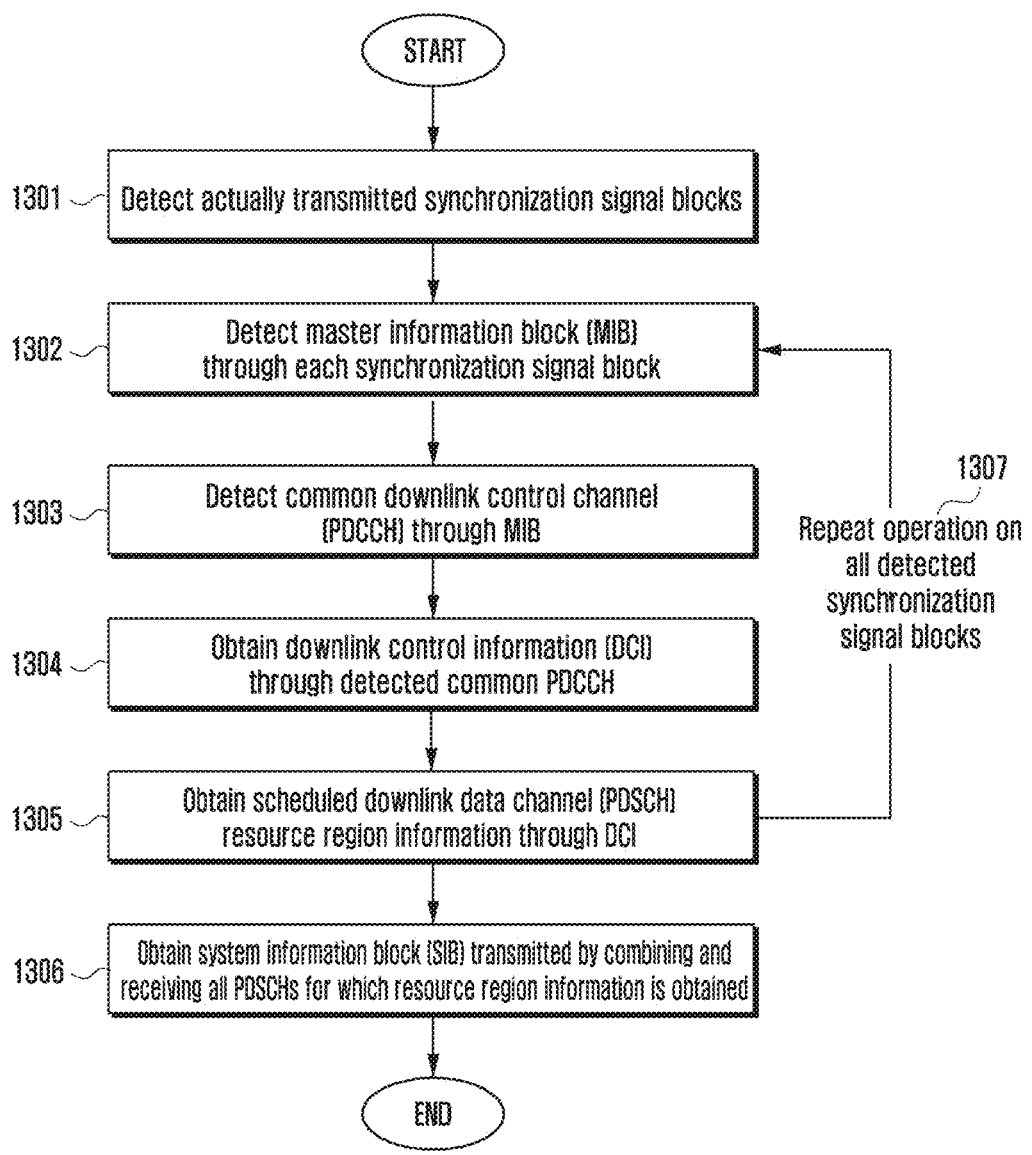
FIG. 13 illustrates an embodiment in which a terminal obtains system information in connection with an embodiment of the disclosure.

FIG. 13 illustrates a procedure in which a terminal receives a plurality of PDSCHs to obtain a system information block according to embodiment 2-2-1.

Referring to FIG. 13, a base station periodically transmits a plurality of synchronization signal blocks including a synchronization signal and a PBCH to terminals in a system, and a terminal detects the synchronization signal blocks actually transmitted by the base station (1301). The terminal is provided with an MIB, which is essential system information, through a plurality of PBCHs respectively included in the plurality of detected synchronization signal blocks (1302). The terminal monitors or retrieves a common downlink control channel (common PDCCH) in a common downlink control channel region (hereinafter, a CORESET or a search space), based on time-domain and frequency-domain information indicated through the MIB (1303). When the terminal detects the common PDCCH, the terminal obtains downlink control information (DCI) transmitted from the base station through the detected common PDCCH (1304). The terminal may obtain scheduling information on a downlink data channel or an uplink data channel through the received DCI information. That is, the DCI may include information on a resource region (or PDSCH transmission region) for the terminal to receive a PDSCH transmitted from the base station or information on a resource region allocated by the base station for the terminal to transmit an uplink data channel (PUSCH). The DCI in operation 1304 includes information on a PDSCH transmission region for the base station to transmit a SIB, and the terminal obtains the information on the PDSCH transmission region from the DCI (1305). The terminal repeatedly performs operation 1302 to operation 1305 on all of the synchronization signal blocks detected in operation 1301 (1307). When the foregoing procedure is completely performed on all of the synchronization signal blocks detected in operation 1301, the terminal decodes or combines all PDSCHs for which resource region information is obtained together, thereby obtaining one system information block (1306).

Figure 14:
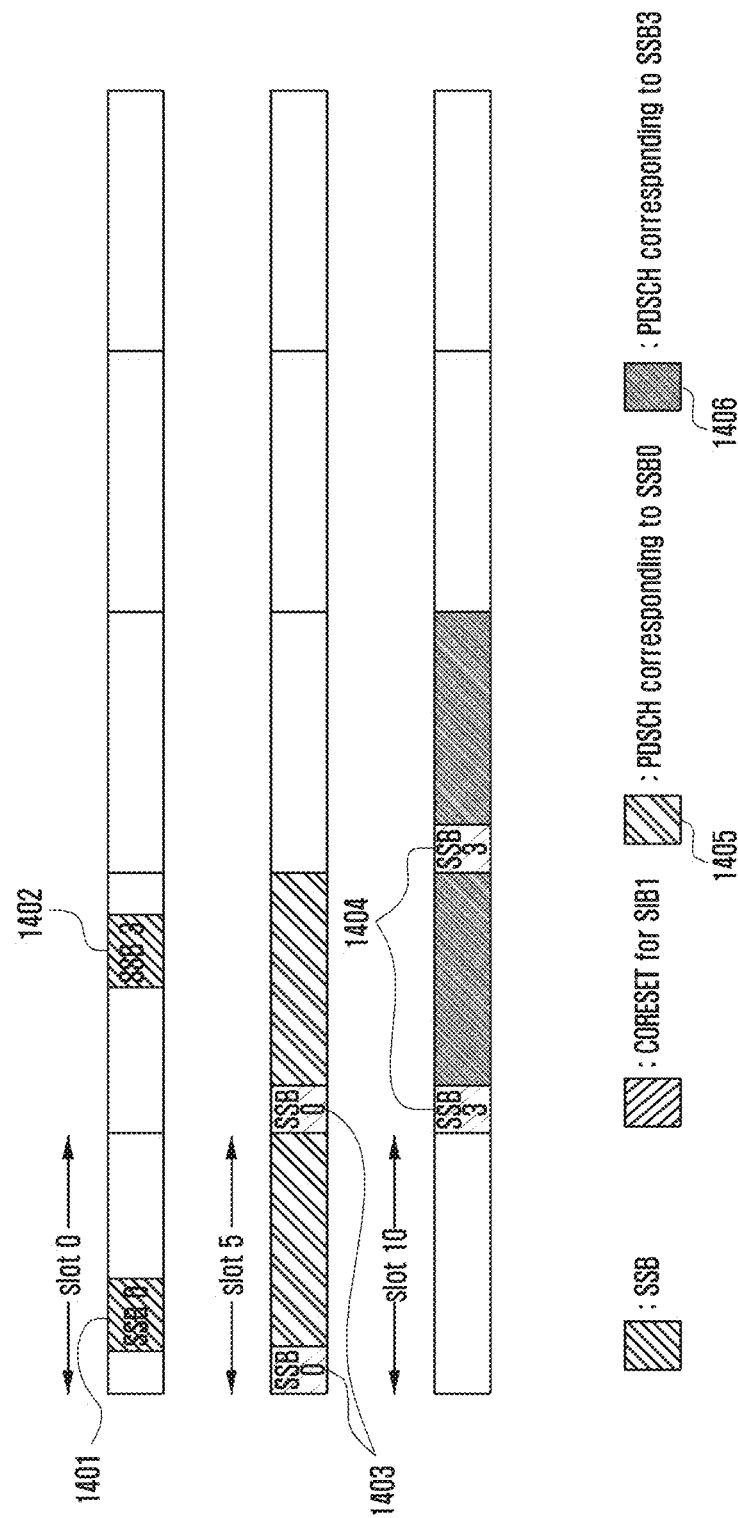
FIG. 14 illustrates an embodiment in which a terminal obtains system information in connection with an embodiment of the disclosure.

FIG. 14 illustrates an example of a method in which a base station transmits a plurality of PDSCHs including the same system information block. First, the base station may actually transmit synchronization signal block #0 1401 and synchronization signal block #3 1402. The base station transmits downlink control information in each of a CORESET 1403 and a CORESET 1404 configured by an MIB included in each of transmitted synchronization signal blocks #0 1401 and #3 1402 and positioned in each of consecutive slots. The base station may transmit the same system information block on PDSCH resources 1405 and 1406 scheduled in individual pieces of downlink control information. As described above, the terminal detects the actually transmitted synchronization signal blocks 1401 and 1402 and detects the pieces of downlink control information from the CORESETs 1403 and 1404 configured in the detected synchronization signal blocks. The terminal may decode or combine and receive all PDSCH 1405 and 1406 in which the same system information block is transmitted, scheduled in the detected pieces of downlink control information, thereby obtaining one system information block. Although FIG. 14 illustrates an embodiment in which the base station transmits up to four synchronization signal blocks in the frequency range FR1, the foregoing embodiment is not limited to the frequency range FR1 and may be applied to the frequency range FR2 and various maximum numbers of synchronization signal blocks.

Embodiment 2-2-2

The base station determines a transmission resource position for a PDSCH corresponding to one or more synchronization signal blocks and transmitting a system information block through an agreement with the terminal in advance. Specifically, the base station may repeatedly transmit a system information block, scheduled by downlink control information detected in a CORESET configured through an MIB of an actually transmitted synchronization signal block, on a resource defined by the same subcarrier position and the same OFDM symbol position in consecutive slots or periodic slots. Accordingly, the terminal detects only one synchronization signal block without needing to detect all system information blocks that are actually transmitted and obtains one piece of downlink control information detected in a CORESET configured through an MIB. The terminal may be allocated a resource of a repeatedly transmitted PDSCH through the obtained downlink control information, and thus may decode or combine and receive all of one or more PDSCHs through which a system information block is transmitted, thereby obtaining one system information block. The number of times the PDSCH in which the system information block is transmitted is repeatedly transmitted or the period of time resources may be included in the downlink control information or may be included in the MIB. The base station may configure the foregoing pieces of information in the terminal through L1 signaling (downlink channel) or a master information block (MIB), or the foregoing pieces of information may be configured to a value agreed between the terminal and the base station. As described above, since resources in which a PDSCH corresponding to each synchronization signal block can be configured are limited, the PDSCHs repeatedly transmitted by the base station may correspond to one synchronization signal block or a plurality of synchronization signal blocks in this embodiment. That is, the base station may transmit the repeatedly transmitted PDSCHs through the same beam or through a plurality of beams.

Figure 15:
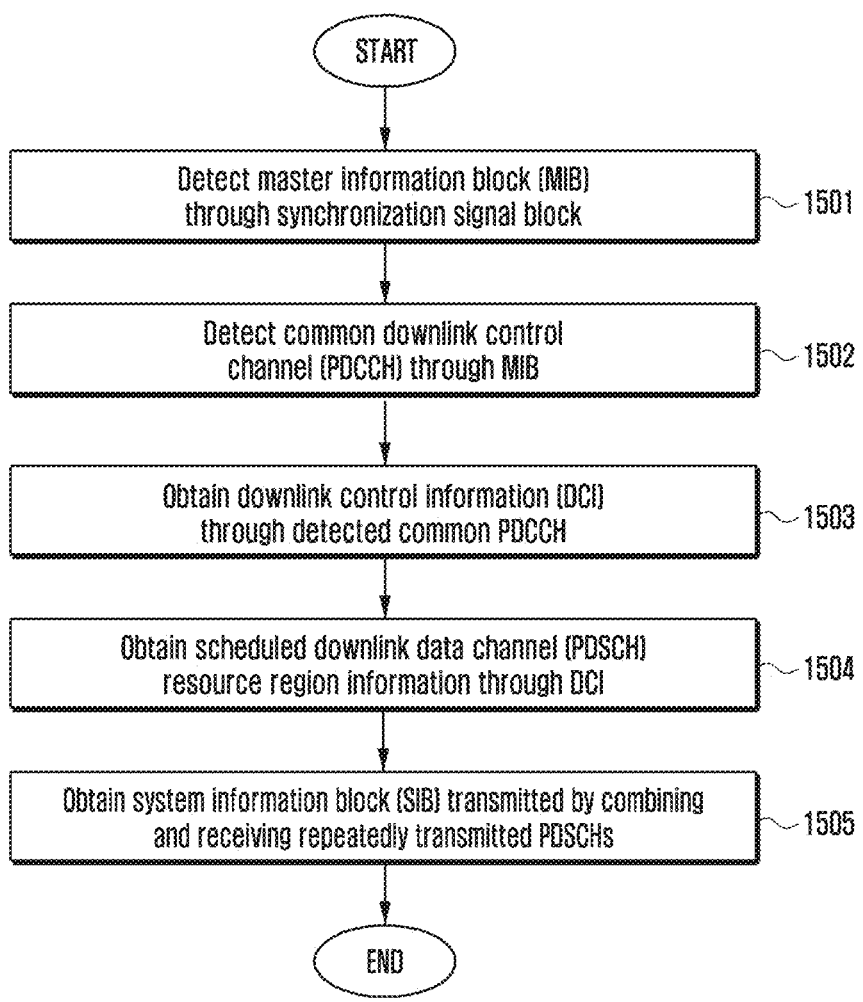
FIG. 15 illustrates an embodiment in which a terminal obtains system information in connection with an embodiment of the disclosure.

FIG. 15 illustrates a procedure in which a terminal receives a plurality of PDSCHs to obtain a system information block according to embodiment 2-2-2.

Referring to FIG. 15, a base station periodically transmits a synchronization signal block including a synchronization signal and a PBCH to a plurality of terminals in a system, and a terminal obtains time and frequency synchronization through the synchronization signal and obtains an MIB, which is essential system information, through the PBCH (1501). The terminal monitors or retrieves a common downlink control channel (common PDCCH) in a common downlink control channel region (hereinafter, a CORESET or a search space), based on time-domain and frequency-domain information indicated through the MIB (1502). When the terminal detects the common PDCCH, the terminal obtains downlink control information (DCI) transmitted from the base station through the detected common PDCCH (1503). The terminal may obtain scheduling information on a downlink data channel or an uplink data channel through the received DCI information. That is, the DCI may include information on a resource region (or PDSCH transmission region) for the terminal to receive a PDSCH transmitted from the base station or information on a resource region allocated by the base station for the terminal to transmit an uplink data channel (PUSCH). The DCI obtained by the terminal in operation 1503 includes information on a PDSCH transmission region for the base station to transmit a SIB, and the terminal obtains the information on the PDSCH transmission region from the DCI (1504). Upon obtaining resource region information, the terminal decodes or combines and receives all repeated PDSCHs together, thereby obtaining one system information block (1505).

Figure 16:
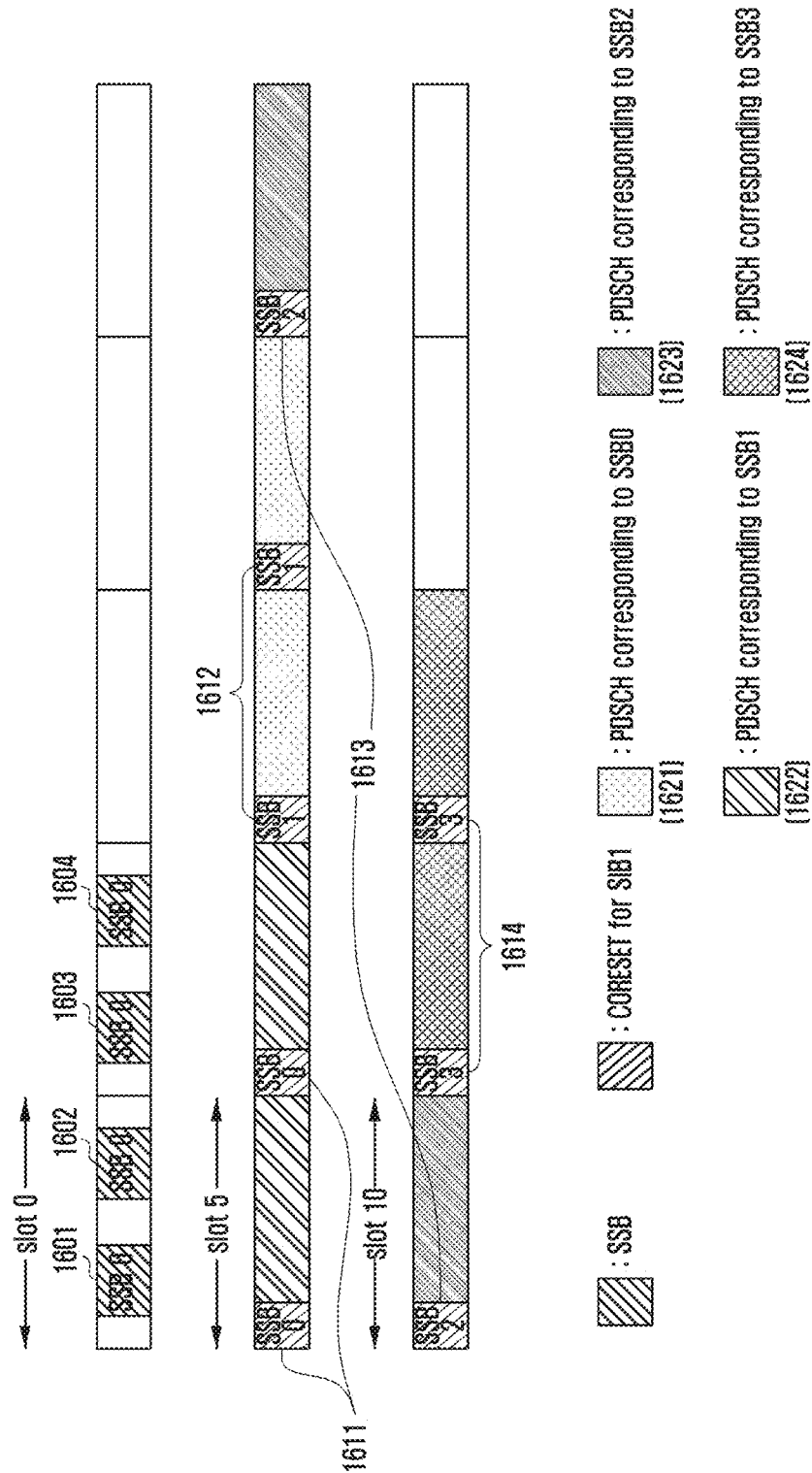
FIG. 16 illustrates an embodiment in which a terminal obtains system information in connection with an embodiment of the disclosure.

FIG. 16 illustrates an embodiment in which a base station transmits a plurality of PDSCHs including the same system information block. First, the base station may actually transmit synchronization signal block #0 1601, synchronization signal block #1 1602, synchronization signal block #2 1603, and synchronization signal block #3 1604. The base station transmits downlink control information in each of a CORESET 1611 in consecutive slots corresponding to synchronization signal block #0 1601, a CORESET 1612 in consecutive slots corresponding to synchronization signal block #1 1602, a CORESET 1613 in consecutive slots corresponding to synchronization signal block #2 1603, and a CORESET 1614 in consecutive slots corresponding to synchronization signal block #3 1604 through an MIB included in transmitted synchronization signal blocks #0 1601, #1 1602, #2 1603, and #3 1604. The base station transmits the same system information block in PDSCH resources 1621, 1622, 1623, and 1624 scheduled in the respective pieces of downlink control information.

The terminal detects a synchronization signal block (e.g., synchronization signal blocks #1 1602) and detects downlink control information in a CORESET (e.g., 1612) configured in the detected synchronization signal block. The terminal may combine and receive all PDSCHs (e.g., 1622, 1623, and 1624) through which the system information block is transmitted in resource information configured by the detected downlink control information. Here, since the terminal in advance that the system information block is transmitted in the PDSCHs on the same symbol and frequency resources in the consecutive slots (that is, repeatedly transmitted in a total of eight slots), the terminal may receive the system information block from the PDSCHs even though not detecting all synchronization signal blocks. Although FIG. 16 illustrates an embodiment in which the base station transmits up to four synchronization signal blocks in the frequency range FR1, the foregoing embodiment is not limited to the frequency range FR1 and may be applied to the frequency range FR2 and various maximum numbers of synchronization signal blocks.

Each of the foregoing embodiments is not intended to provide a single method for allocating a resource for a PDSCH through which a system information block (or SIB1) is transmitted or a single method for repeatedly transmitting a system information block, and some or all of the one or more embodiments may be combined to provide a method for allocating a resource for a PDSCH through which a system information block is transmitted or a method for repeatedly transmitting a system information block.

Figure 17:
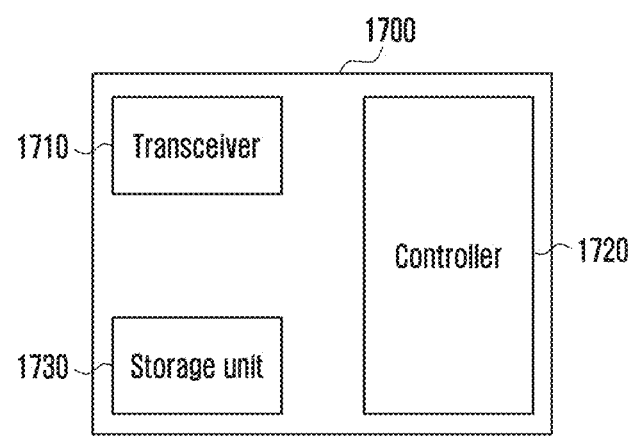
FIG. 17 is a block diagram of a terminal according to an embodiment of the disclosure.

FIG. 17 is a block diagram of a terminal according to an embodiment of the disclosure.

Referring to FIG. 17, the terminal 1700 may include a transceiver 1710, a controller 1720, and a storage unit 1730. The transceiver 1710, the controller 1720, and the storage unit 1730 of the terminal 1700 may operate according to the foregoing embodiments. However, components of the terminal 1700 according to the embodiment are not limited to the foregoing examples, and the terminal 1700 may include a greater number of components or a smaller number of components than that of the illustrated components. In a specific case, the transceiver 1710, the controller 1720, and the storage unit 1730 may be configured as a single chip.

According to another embodiment, the transceiver 1710 may be configured as a transmitter and a receiver. The transceiver 1710 may transmit and receive a signal to and from a base station. The signal may include control information and data. To this end, the transceiver 1710 may include an RF transmitter to upconvert and amplify the frequency of a transmitted signal and an RF receiver to low-noise amplify and downconvert a received signal. Further, the transceiver 1710 may receive a signal through a radio channel to output the signal to the controller 1720 and may transmit a signal output from the controller 1720 through a radio channel.

The controller 1720 may control a series of processes to enable the terminal 1700 to operate according to the foregoing embodiments of the disclosure. For example, the controller 1720 may differently control a method for transmitting and receiving a data channel through which a system information block is transmitted according to an embodiment of the disclosure, that is, a method for configuring a resource for a data channel of a system information block or a method for repeatedly receiving a data channel of a system information block. The controller 1720 may be configured as at least one processor.

The storage unit 1730 may store control information, such as a resource configuration of a data channel of a system information block included in a signal obtained by the terminal 1700 and the period and number of repetitions of the data channel of the system information block, or data and may include an area for storing data needed for the controller 1720 to perform control and data generated when the controller 1720 performs control.

Figure 18:
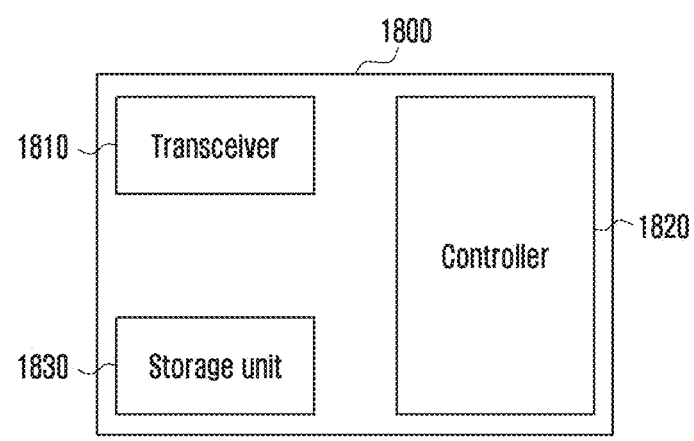
FIG. 18 is a block diagram of a base station according to an embodiment of the disclosure.

FIG. 18 is a block diagram of a base station according to an embodiment of the disclosure.

Referring to FIG. 18, the base station 1800 may include a transceiver 1810, a controller 1820, and a storage unit 1830. The transceiver 1810, the controller 1820, and the storage unit 1830 of the base station 1800 may operate according to the foregoing embodiments. However, components of the base station 1800 according to the embodiment are not limited to the foregoing examples, and the base station 1800 may include a greater number of components or a smaller number of components than that of the foregoing components. In a specific case, the transceiver 1810, the controller 1820, and the storage unit 1830 may be configured as a single chip.

According to another embodiment, the transceiver 1810 may be configured as a transmitter and a receiver. The transceiver 1810 may transmit and receive a signal to and from a terminal. The signal may include control information and data. To this end, the transceiver 1810 may include an RF transmitter to upconvert and amplify the frequency of a transmitted signal and an RF receiver to low-noise amplify and downconvert a received signal. Further, the transceiver 1810 may receive a signal through a radio channel to output the signal to the controller 1820 and may transmit a signal output from the controller 1820 through a radio channel.

The controller 1820 may control a series of processes to enable the base station 1800 to operate according to the foregoing embodiments of the disclosure. For example, the controller 1820 may differently control a method for transmitting and receiving a data channel through which a system information block is transmitted according to an embodiment of the disclosure, that is, a method for configuring a resource for a data channel of a system information block or a method for repeatedly transmitting a data channel of a system information block. The controller 1820 may be configured as at least one processor.

The storage unit 1830 may store control information, such as a resource configuration of a data channel of a system information block determined by the base station 1800 and the period and number of repetitions of the data channel of the system information block, data, or control information and data received from a terminal and may include an area for storing data needed for the controller 1820 to perform control and data generated when the controller 1820 performs control.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented.

Further, it will be apparent that one or more of the above-described embodiments may be employed partially or fully in combination.

The invention claimed is:

1. A method performed by a terminal in a wireless communication system, the method comprising:
   receiving, from a base station, a synchronization signal block (SSB);
   receiving, from the base station, downlink control information for scheduling a physical downlink shared channel (PDSCH) in which a system information block (SIB) is transmitted, based on a master information block (MIB) included in the SSB;
   identifying a transmission period and a number of repetitions of the SIB; and
   receiving, from the base station, the SIB repeatedly in a plurality of slots, based on the scheduled PDSCH, the transmission period, and the number of repetitions,
   wherein the SIB is repeatedly received at a same position in a time domain and a frequency domain in each of the plurality of slots.

2. The method of claim 1, wherein the SIB is repeatedly received through the PDSCH as many times as the number of repetitions according to the transmission period.

3. The method of claim 2, wherein the SIB is repeatedly received at a same orthogonal frequency-division multiplexing (OFDM) symbol position in the time domain and a same subcarrier position in the frequency domain in each of the plurality of slots, and
   wherein the receiving of the SIB comprises not monitoring a control resource set (CORESET) corresponding to the SSB while the SIB is repeatedly received through the scheduled PDSCH.

4. The method of claim 1, wherein the transmission period and the number of repetitions are included in the downlink control information, are included in the MIB, or are identified from a value predetermined in the terminal.

5. A method performed by a base station in a wireless communication system, the method comprising:
   transmitting, to a terminal, a synchronization signal block (SSB);
   transmitting, to the terminal, downlink control information for scheduling a physical downlink shared channel (PDSCH) in which a system information block (SIB) is transmitted, based on a master information block (MIB) included in the SSB;
   identifying a transmission period and a number of repetitions of the SIB; and
   transmitting, to the terminal, the SIB repeatedly in a plurality of slots, based on the scheduled PDSCH, the transmission period, and the number of repetitions,
   wherein the SIB is repeatedly transmitted at a same position in a time domain and a frequency domain in each of the plurality of slots.

6. The method of claim 5, wherein the SIB is repeatedly transmitted through the PDSCH as many times as the number of repetitions according to the transmission period, and
   wherein the repeatedly transmitted SIB is transmitted at a same orthogonal frequency-division multiplexing (OFDM) symbol position in the time domain and a same subcarrier position in the frequency domain in each of the plurality of slots.

7. The method of claim 5, wherein the transmission period and the number of repetitions are included in the downlink control information, are included in the MIB, or are identified from a value predetermined in the base station.

8. A terminal in a wireless communication system, the terminal comprising:
   a transceiver configured to transmit or receive a signal; and
   a controller configured to:
      receive, from a base station, a synchronization signal block (SSB),
      receive, from the base station, downlink control information for scheduling a physical downlink shared channel (PDSCH) in which a system information block (SIB) is transmitted, based on a master information block (MIB) included in the SSB,
      identify a transmission period and a number of repetitions of the SIB, and
      receive, from the base station, the SIB repeatedly in a plurality of slots, based on the scheduled PDSCH, the transmission period, and the number of repetitions,
      wherein the SIB is repeatedly received at a same position in a time domain and a frequency domain in each of the plurality of slots.

9. The terminal of claim 8, wherein the SIB is repeatedly received through the PDSCH as many times as the number of repetitions according to the transmission period.

10. The terminal of claim 9, wherein the SIB is repeatedly received at a same orthogonal frequency-division multiplexing (OFDM) symbol position in the time domain and a same subcarrier position in the frequency domain in each of the plurality of slots, and
   wherein the controller does not monitor a control resource set (CORESET) corresponding to the SSB while the SIB is repeatedly received through the scheduled PDSCH.

11. The terminal of claim 8, wherein the transmission period and the number of repetitions are included in the downlink control information, are included in the MIB, or are identified from a value predetermined in the terminal.

12. A base station in a wireless communication system, the base station comprising:
  a transceiver configured to transmit or receive a signal; and
  a controller configured to:
    transmit, to a terminal, a synchronization signal block (SSB),
    transmit, to the terminal, downlink control information for scheduling a physical downlink shared channel (PDSCH) in which a system information block (SIB) is transmitted, based on a master information block (MIB) included in the SSB,
    identify a transmission period and a number of repetitions of the SIB, and
    transmit, to the terminal, the SIB repeatedly in a plurality of slots, based on the scheduled PDSCH, the transmission period, and the number of repetitions,
  wherein the SIB is repeatedly transmitted at a same position in a time domain and a frequency domain in each of the plurality of slots.

13. The base station of claim 12, wherein the SIB is repeatedly transmitted through the PDSCH as many times as the number of repetitions according to the transmission period.

14. The base station of claim 13, wherein the repeatedly transmitted SIB is transmitted at a same orthogonal frequency-division multiplexing (OFDM) symbol position in the time domain and a same subcarrier position in the frequency domain in each of the plurality of slots.

15. The base station of claim 12, wherein the transmission period and the number of repetitions are included in the downlink control information, are included in the MIB, or are identified from a value predetermined in the base station.

* * * * *